United States Patent [19]

Kouno et al.

[11] Patent Number: 5,329,597
[45] Date of Patent: Jul. 12, 1994

[54] DEVICE AND METHOD FOR MEASURING ANGLES OF A WORK

[75] Inventors: Hidehiko Kouno, 167, 2-chome, Dosho-cho, Yonago-shi, Tottori 683; Yoshiaki Niwa, Kanagawa; Akira Sengoku, Kanagawa; Takayuki Aoki, Kanagawa, all of Japan

[73] Assignees: Amada Company, Ltd., Kanagawa; Hidehiko Kouno, Tottori, both of Japan; a part interest

[21] Appl. No.: 768,205
[22] PCT Filed: Feb. 22, 1991
[86] PCT No.: PCT/JP91/00234
 § 371 Date: Dec. 4, 1991
 § 102(e) Date: Dec. 4, 1991
[87] PCT Pub. No.: WO91/13318
 PCT Pub. Date: Sep. 5, 1991

[30] Foreign Application Priority Data

Feb. 23, 1990 [JP] Japan ................... 2-41258
Mar. 9, 1990 [JP] Japan ................... 2-56325
Mar. 15, 1990 [JP] Japan ................... 2-62793

[51] Int. Cl.5 .............................. G06K 9/00
[52] U.S. Cl. .................. 382/8; 364/474.07; 382/25; 348/88; 348/142
[58] Field of Search .......... 382/8, 30, 34, 22, 25; 358/101, 106, 107; 364/472, 474.02, 474.07

[56] References Cited

U.S. PATENT DOCUMENTS 4,845,764 7/1989 Ueda et al. ................. 382/8
4,942,618 7/1990 Sumi et al. ................. 382/8
5,137,362 8/1992 LeBeau ..................... 382/8

FOREIGN PATENT DOCUMENTS 54-36758 3/1979 Japan .
59-18408 1/1984 Japan .
59-160707 9/1984 Japan .
59-176611 10/1984 Japan .
59-160708 11/1984 Japan ..................... 382/8
59-197813 11/1984 Japan .
63-2687 1/1988 Japan .

OTHER PUBLICATIONS

Takano, Hidehiko, "Recognizing Techniques for Shape Patterns," The Information Research Party, pp. 31-32.
English Language Abstract of Japanese Document No. 59-197813.
English Language Abstract of Japanese Document No. 59-18408.
English Language Abstract of Japanese Document No. 59-160707.
English Language Abstract of Japanese Document No. 59-176611.
Japanese Search Report.

Primary Examiner—Joseph Mancuso
Attorney, Agent, or Firm—Sandler Greenblum & Bernstein

[57] ABSTRACT

A device is provided for measuring an angle between two intersecting surfaces of a work. The device includes a light emitting device for inducing a light pattern on the surfaces of the work, a camera for picking up the pattern, and an image processor for processing the picture of the pattern and obtaining the angle of the work.

22 Claims, 23 Drawing Sheets

| 0 0 | 1 1 | 1 0 | 1 1 | | 1 1 |
|-----|-----|-----|-----|---|-----|
| 1 1 | 0 0 | 1 1 | 0 1 | | 1 1 |

HORI [−]   SLOR [ ) ]   BODY [∗]

| 1 0 | 0 1 | 0 1 | 1 1 | | 0 0 |
|-----|-----|-----|-----|---|-----|
| 1 0 | 0 1 | 1 1 | 1 0 | | 0 0 |

VERT [ | ]   SLOL [ ( ]   SPAC [ ]

| 1 0 | 0 1 | 0 0 | 0 0 | 1 0 | 0 1 |
|-----|-----|-----|-----|-----|-----|
| 0 0 | 0 0 | 1 0 | 0 1 | 0 1 | 1 0 |

VERX [+]

DEVICE AND METHOD FOR MEASURING ANGLES OF A WORK

TECHNICAL FIELD

This invention relates to a device and a method for measuring a bending angle of a bent workpiece or a present bending angle of a workpiece under bending process, or an angle of a workpiece.

BACKGROUND ART

In the prior art, it is general than an instrument such as a square or a protractor is used for measuring a bending angle of a work sheet bent.

However, this method takes much time and causes an error for measuring due to a person who measures the angle. Further, this method prevents automation of the examining process notwithstanding a current of factory automation. Furthermore, this method prevents automatic determination of the final relative position of upper and lower dies thereby a desired bending angle is finally obtained after the present bending angle is detected during the bending process.

Such an automated bending processing is indicated in Japanese Patent 63-2687 (B) titled "A device for detecting bending angles of a work for a press brake", where a surface near the end of the work sheet is picked up by a visual sensor during bending processing, and the least bending angle of the work sheet is detected.

In the above patent, however, the bending angle is not obtained with high precision, because the sensor picks up the surface near the end part of the work sheet, at which generally a burr, warp, or taper exists. These obstacles make it difficult to detect an actual bending angle.

In particular, when a reflected light pattern is picked up at such an end part of the work sheet and when the end part is tapered, the image obtained from the reflected light is different from the actual light pattern since the reflected light has blurs. When a pickup device for light of permeability is used, a floodlight is required. In this case, the arrangements become bigger and therefore they are not used usually.

Furthermore, if the angle is detected at the end part, the composition of the frames of the bending machine would be limited since the position of the visual sensor is limited to the vicinity of the end part.

In addition, when the angle is detected at the end part, the angle detected is not representative one because the work is curved like a bow due to what is called "center flexure phenomenon."

DISCLOSURE OF INVENTION

The primary object of this invention is to solve the above problems and to provide a method and a device by which an representative bending angle of the work is detected with precision.

A further object of this invention is to provide a device for a bending machine to measure a bending angle quickly and precisely of a work sheet bent by the bending machine.

The method of measuring the angle formed by two surfaces of the work which has a V-shaped section as a whole or in part is proposed. In this method, light is so emitted to the two surfaces of the work as to induce a successive or intermittent linear light pattern on the surfaces; the pattern is picked up in a direction and projected on a coordinate plane as an image; then the linear light pattern picked up on the coordinate plane is processed, and inclinations of the light pattern with a coordinate axis of the coordinate plane are detected for obtaining the angle formed by the two surfaces.

The device for measuring the angle utilizes the method. The device includes a light emitting device for emitting light toward the two surfaces in order to induce a successive or intermittent linear light pattern on the surfaces, a pickup device for picking up the light pattern in a direction for projecting on a coordinate plane, an image processor for processing the picked up pattern and detecting inclinations of the pattern with a coordinate axis of the coordinate plane for obtaining the angle formed by the two surfaces.

This device is applied to a bending machine. In the bending machine, the light emitting device and the pickup device are attached to or near to a tool (punch and die), and the angle of the work sheet formed by the bending machine is measured by the angle measuring device. The light emitting and pickup devices are disposed in the vicinity of the tools, or embedded or incorporated in the tools. In an example, the light emitting and pickup devices are movable for measuring the bending angles of any parts of the work sheet.

BEST MODE FOR CARRYING OUT THE INVENTION

Now, the present invention is explained in detail through embodiments with reference to the accompanying drawings.

Figure 1:
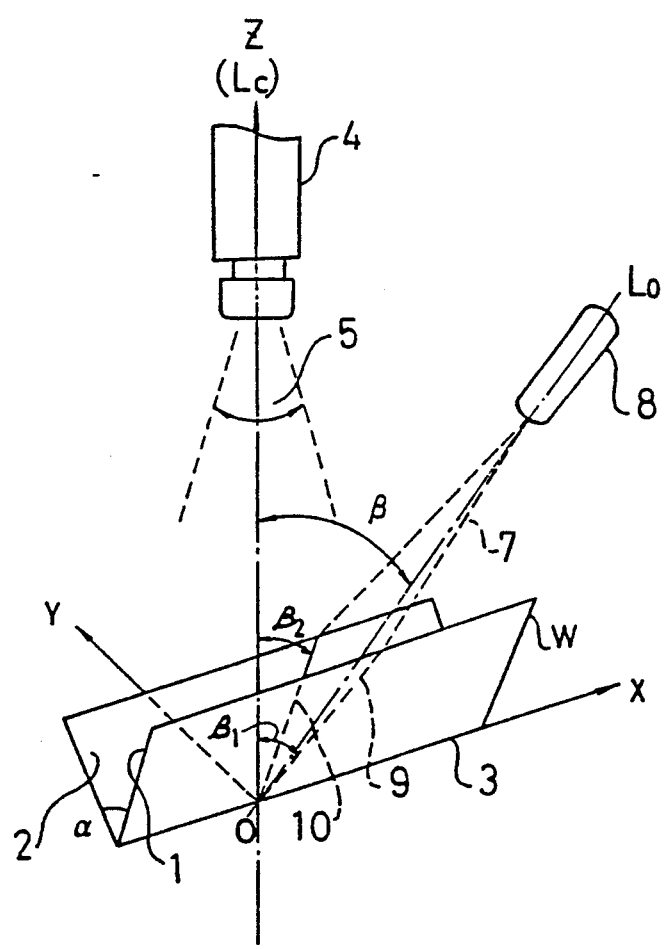
FIGS. 1 and 2 are perspective views for explaining a method of the present invention for measuring an angle formed by two surfaces.
Figure 2:
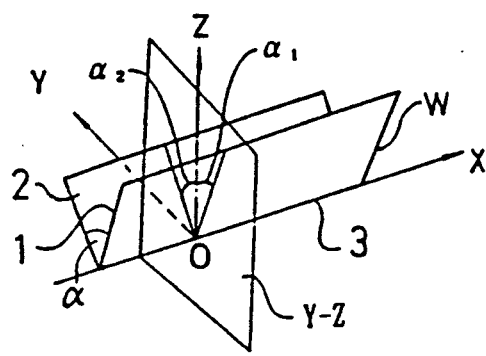

FIGS. 1 to 3 are explanatory diagrams to show how to measure the angle of the works.

In FIG. 1, in order to measure an angle $\alpha$ formed by two intersecting surfaces 1, 2 of a work W (the thickness of the work is neglected), a CCD camera 4 as a visual sensor and a light emitting device 8 such as a light emitting diode are arranged. Cartesian coordinates X, Y, and Z are used as shown in FIGS. 1 and 2. An intersection 3 of the two surfaces 1, 2 lies in the axis X, and the CCD camera 4 lies in the axis Z perpendicular to the axis X. The camera 4 with the vision 5 is orientated to an intersection (the origin) O of the axes X and Z for picking up a picture. Lc is a light axis of the camera 4. A coordinate plane of an area sensor of the CCD camera is equivalent to a coordinate plane XY.

The light emitting device or diode 8 emits light which passes through a slit (not shown) disposed in front of the diode. Therefore, plane light 7 is emitted to the work W. The plane light 7 passes the origin O and is inclined an angle $\beta$ with the axis Z. Hence, the plane light 7 causes a pattern of linear lines 9, 10 on the surfaces 1, 2 of the work W. The plane light 7 need not pass the origin O andmay be a plane parallel to that which passes the origin O. Lo is a light axis of the light emitting device 8.

Figure 3A:
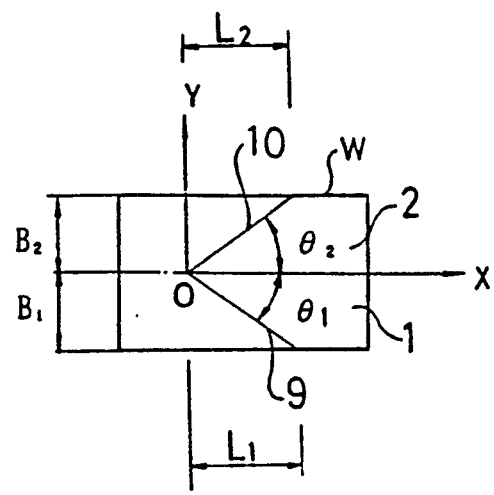
FIG. 3a, 3b, and 3c are respectively a plan, a front view, and right side view of FIG. 2.
Figure 3B:
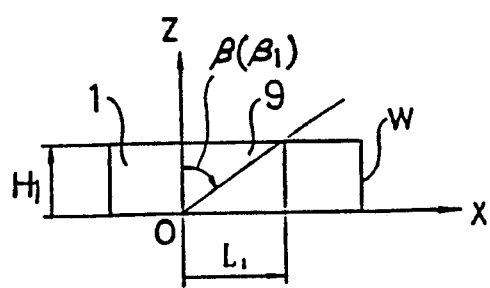
Figure 3C:
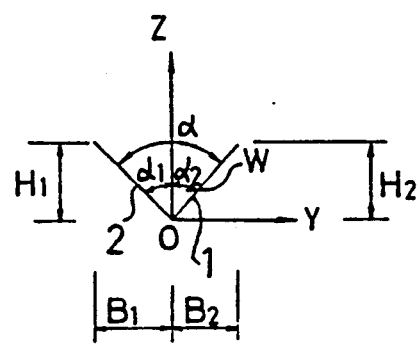

As seen from FIGS. 2 and 3c, the angle $\alpha$ formed by the surfaces 1, 2 is obtained as a sum of inclinations $\alpha_1$, $\alpha_2$ of the surfaces 1, 2 with respect to the axis Z.

$$\alpha = \alpha_1 + \alpha_2 \tag{1}$$

Therefore, the angle $\alpha$ formed by the surfaces 1, 2 is obtained by detecting the inclinations $\alpha_1$, $\alpha_2$.

FIGS. 3a, 3b, and 3c are respectively a plan, a front view, and a right elevation of FIG. 2. The plan or picture shown in FIG. 3a can be picked up on the area sensor of the CCD camera 4. In FIGS. 3a to 3c, when angles of the projected lines of the light pattern 9, 10 upon the plane XY with the axis X are respectively given by $\theta_1$, $\theta_2$, the widths and heights of the surfaces 1, 2 are respectively given by $B_1$, $B_2$ and $H_1$, $H_2$, and the lengths of the projected lines of the pattern 9, 10 upon the axis X are given by $L_1$, $L_2$, the following equations are yielded.

$$\tan \alpha_1 = \frac{B_1}{H_1} \tag{2}$$

$$\tan \beta = \frac{L_1}{H_1} \tag{3}$$

$$\tan \theta_1 = \frac{B_1}{L_1} \tag{4}$$

From the above equations (2), (3) and (4), $$\tan \alpha_1 = \tan \theta_1 \cdot \tan \beta$$

$$\alpha_1 = \tan^{-1}(\tan \theta_1 \cdot \tan \beta) \tag{5}$$

Similarly for the surface 2, $$\alpha_2 = \tan^{-1}(\tan \theta_2 \cdot \tan \beta) \tag{6}$$

Here, the folding angle $\alpha$ of the work W is obtained from the equation (1).

When $\beta = 45$ degrees, $\alpha$ is obtained as follows.

$$\alpha = \theta_1 + \theta_2$$

Therefore, $\alpha$ is easily obtained if $\theta_1$ and $\theta_2$ are given.

Figure 14:
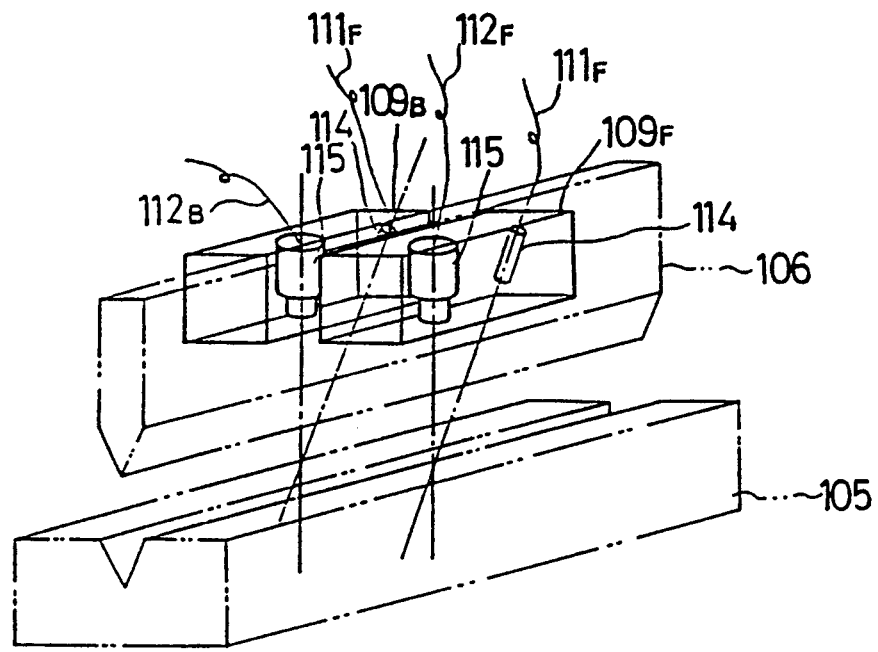
FIG. 14 is a perspective view showing an example where a light emitting and an image pickup devices of a measuring device of the present invention for measuring a folding angle of a work are attached to the vicinity of a die of a bending machine.
Figure 15:
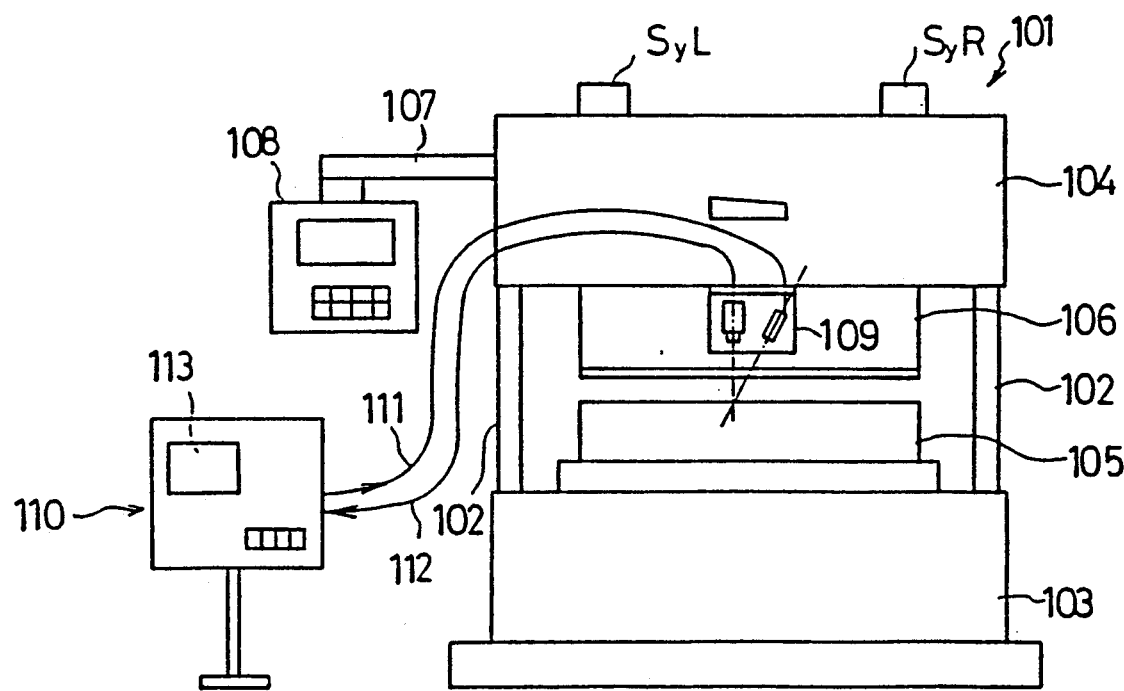
FIG. 15 is a front view of the bending machine provided with the measuring device for measuring the folding angle of the work.
Figure 18:
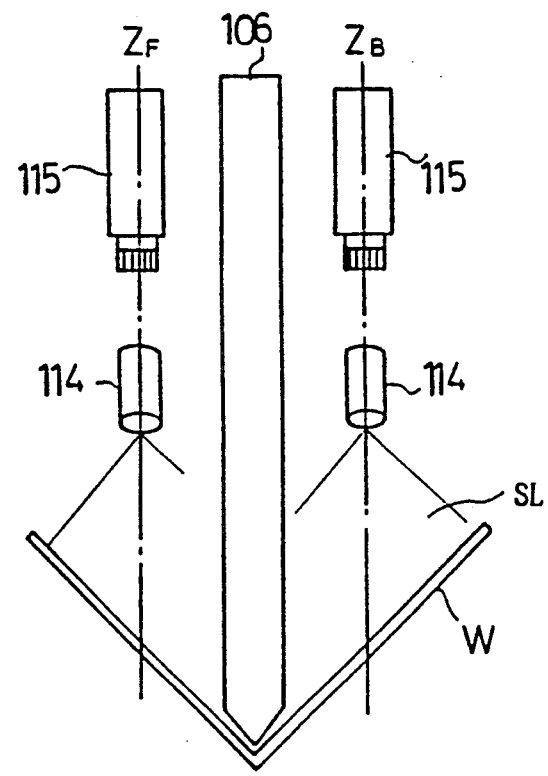
FIG. 18 is a diagram modeled from FIG. 17.

A plane of light 7 and a CCD camera 4 are used in the above-described method for measuring the angle $\alpha$ formed by the surfaces 1, 2. In the present invention as shown in FIGS. 14 and 18, however, two light emitting devices 114, 114 may be used in such a way as to emit two planes of light SL. In this case, if emissive angles $\beta$ of the two light emitting devices 114, 114 with the plane XY are given by $\beta_1$ and $\beta_2$ (FIG. 1), equations (5) and (6) are respectively presented by $$\alpha_1 = \tan^{-1}(\tan \theta_1 \cdot \tan \beta_1) \tag{5a}$$

$$\alpha_2 = \tan^{-1}(\tan \theta_2 \cdot \tan \beta_2) \tag{5b}$$

Then, the angle $\alpha$ is obtained.

Although a slit is disposed in front of the light emitting device 8 in order to produce plane light in the above example, the slit may be replaced with a plurality of small holes arranged in a row. What is required is to emit a successive or intermittent linear light pattern 9, 10 on the surfaces 1, 2 of the work W. Therefore, light to be emitted is not necessary to be plane light. Spot light or a beam may be scanned successively or intermittently over the surfaces 1, 2 so that a linear light pattern 9, 10 can appear on the surfaces 1, 2.

In the above example, a CCD camera 4 is used, however any type of camera may be used if it can pick up a two-dimensional picture. Furthermore, any type of light emitting device may be used if it can emit plane light or the like instead of using a laser diode and a slit. But, a light emitting device such as a laser beam which has high linearity is preferable because the linearity of plane light affects precision of detecting of the angle.

Figure 4:
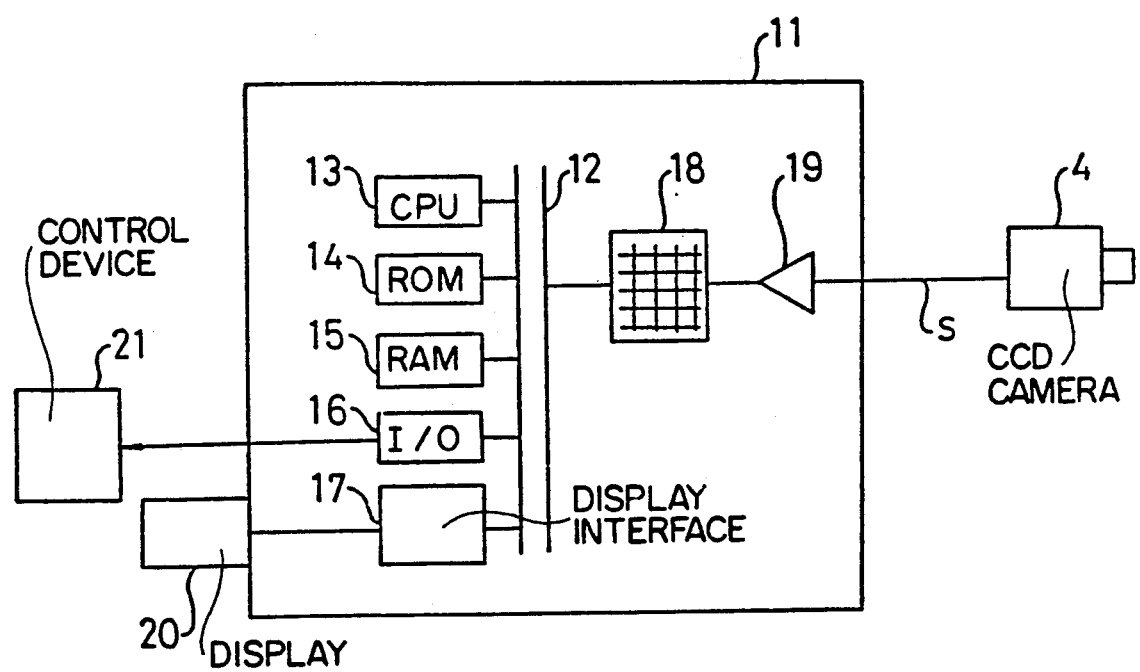
FIG. 4 is a block diagram showing the make-up of an image processor used for a method and a device of the present invention for measuring the angle.

FIG. 4 is a block diagram showing an example of an image processor 11 to be connected to the CCD camera 4. The image processor 11 has a system bus to which CPU 13, ROM 14, RAM 15, input-output (I/O) device 16, display interface 17 and picture memory 18 are connected. The picture memory 18 is provided with a two-value (A/D) converting circuit 19 which converts the picture signals S from the CCD camera 4 into two-valued signals. A display 20 is connected to the display interface 17, and a control or NC device 21 of a bending machine is to be connected to the I/O device 16.

Figure 5:
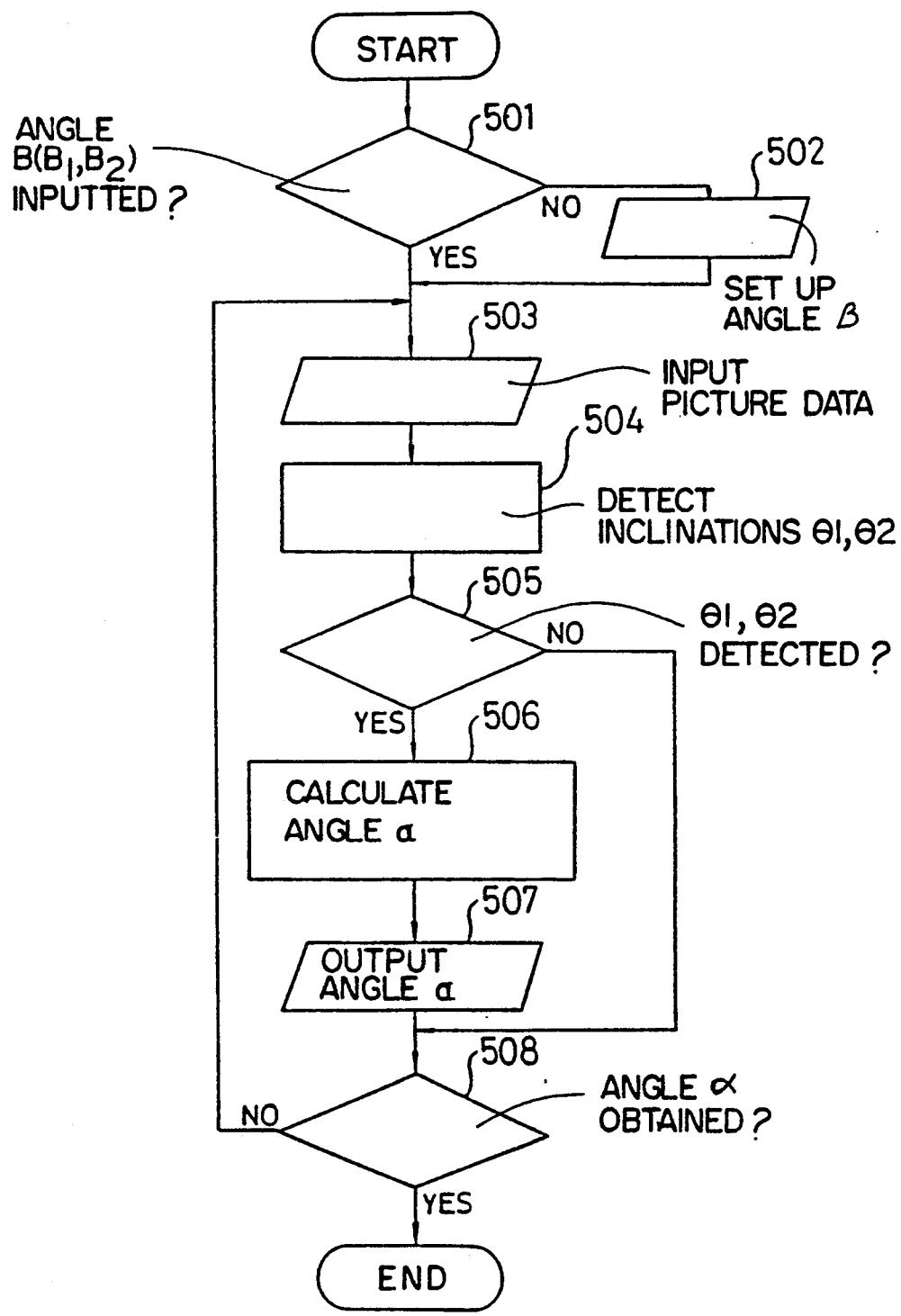
FIG. 5 is a flow chart for showing how to detect the angle by using the measuring method.

In the above arrangement, the picture shown in FIG. 3a is obtained on the picture memory 18; the angle $\alpha$ is measured by carrying out a process shown in FIG. 5 by means of CPU 13; and the result of the processing is sent to the display 20 and/or the control device 21.

In FIG. 5, the operation for obtaining the folding angle starts, and at block 501 it is determined whether the value of the angle $\beta$ ($\beta_1$, $\beta_2$) is inputted. If negative, the operation goes to block 502 where the angle $\beta$ is set up.

When positive at block 501, the operation goes to block 503 where the picture data are inputted. The operation goes to next block 504 where the inclinations $\theta_1$, $\theta_2$ of the light pattern 9, 10 are detected, and at next block 505 it is determined whether the inclinations $\theta_1$, $\theta_2$ are detected or not. If negative, the operation goes back to block 503 through block 508. If positive at block 505, the operation goes to block 506 where the folding angle $\alpha$ of the work W are calculated from equations (1)–(6).

Then, the operation goes to block 507 where the value of the angle $\alpha$ is outputted, and the operation goes to block 508. At block 508, it is detected whether the value of the angle $\alpha$ is obtained. If negative, the operation goes back to block 503. If positive, the operation ends.

When the picture signals S are converted into digital ones, they are two-valued in such a way as to assign the pattern part 9, 10 of the picture "1" and the remaining part of the picture "0" in this example. Then, the two valued signals are stored in the picture memory 18, and the inclinations $\theta_1$, $\theta_2$ are to be obtained from the area of "1" in windows W1, W2 (FIG. 7) of the memory 18. The inclinations $\theta_1$, $\theta_2$ can be obtained, for example, by making equations for approximate lines by means of the method of least squares and getting inclinations of the approximate lines.

FIGS. 6–11 are diagrams to explain an image processor which utilize the orientation code method. The image processor is improved to be able to process the image with high speed although the processor shown in FIG. 4 requires a large quantity of calculations for making equation for approximate lines by means of the method of least squares and therefore requires processing time.

The orientation code method is to code the directions of a contour line of a figure as shown in "recognizing technics for shape patterns" by Hidehiko TAKANO, published Oct. 15, 1984 by The Information Research Party, pages 31-32. This method is also to expedite processing of pictures by considering 2×2 pixels (FIG. 8) which are an element in a matrix and by processing with hardware seven codes such as a horizontal HORI[−], an inclination in the clockwise direction SLOR[)], an inclination in the anticlockwise direction SLOL[(], a vertical VERT[I], a body BODY[*], a space SPAC[], and a corner VERX[+] into one of which all the elements of the matrix are classified from data of "0" and "1" for the pixels $A_{i,j}$, $A_{i,j+1}$, $A_{i+1,j+1}$, $A_{i+1,j}$ by using the following logical equations.

$\text{HORI}[-] = (\overline{A_{i,j}} \times \overline{A_{i+1,j}} \times A_{i,j+1} \times A_{i+1,j+1}) +$ $\qquad (A_{i,j} \times A_{i+1,j} \times \overline{A_{i,j+1}} \times \overline{A_{i+1,j+1}})$ $\text{SLOR}[)] = (A_{i,j} \times \overline{A_{i+1,j}} \times A_{i,j+1} \times A_{i+1,j+1}) +$ $\qquad (A_{i,j} \times A_{i+1,j} \times \overline{A_{i,j+1}} \times A_{i+1,j+1})$ $\text{SLOL}[(] = (\overline{A_{i,j}} \times A_{i+1,j} \times A_{i,j+1} \times A_{i+1,j+1}) +$ $\qquad (A_{i,j} \times A_{i+1,j} \times A_{i,j+1} \times \overline{A_{i+1,j+1}})$ $\text{VERT}[I] = (A_{i,j} \times \overline{A_{i+1,j}} \times A_{i,j+1} \times \overline{A_{i+1,j+1}}) +$ $\qquad (\overline{A_{i,j}} \times A_{i+1,j} \times \overline{A_{i,j+1}} \times A_{i+1,j+1})$ $\text{BODY}[*] = (A_{i,j} \times A_{i+1,j} \times A_{i,j+1} \times A_{i+1,j+1})$ $\text{SPAC}[\ ] = (\overline{A_{i,j}} \times \overline{A_{i+1,j}} \times \overline{A_{i,j+1}} \times \overline{A_{i+1,j+1}})$ $\text{VERX}[+] = (A_{i,j} \times \overline{A_{i+1,j}} \times \overline{A_{i,j+1}} \times \overline{A_{i+1,j+1}}) +$ $\qquad (\overline{A_{i,j}} \times \overline{A_{i+1,j}} \times A_{i,j+1} \times \overline{A_{i+1,j+1}}) +$ $\qquad (\overline{A_{i,j}} \times \overline{A_{i+1,j}} \times \overline{A_{i,j+1}} \times A_{i+1,j+1}) +$ $\qquad (A_{i,j} \times A_{i+1,j} \times A_{i,j+1} \times A_{i+1,j+1}) +$ $\qquad (A_{i,j} \times \overline{A_{i+1,j}} \times \overline{A_{i,j+1}} \times A_{i+1,j+1}) +$ $\qquad (\overline{A_{i,j}} \times A_{i+1,j} \times A_{i,j+1} \times \overline{A_{i+1,j+1}})$ where, signs x, +, and $\overline{(A_{i,j})}$ mean respectively a logical product, a logical sum, and an exclusive OR.

Figure 7:
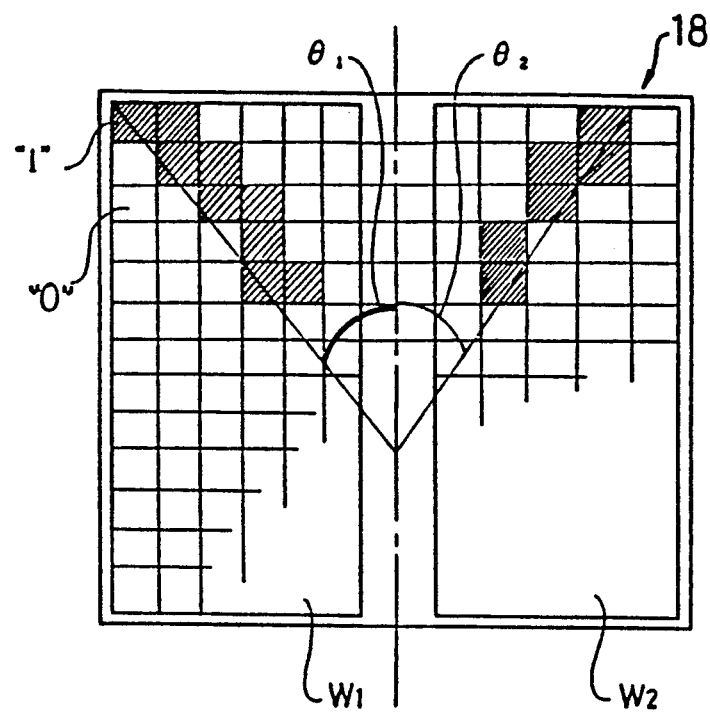
FIG. 7 is a diagram of a picture memory of the image processor for processing a light pattern.
Figure 8:
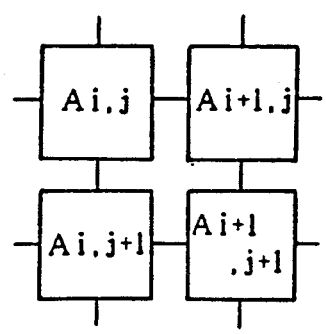
FIG. 8 is an explanatory diagram showing a matrix made of 2×2 pixels.
Figures 9, 10:
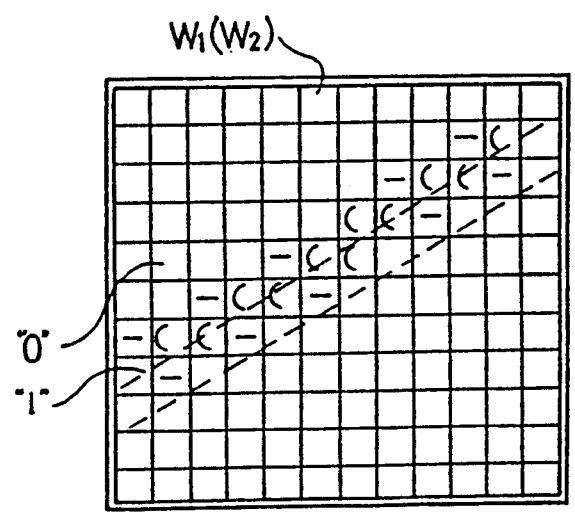
FIG. 9 is an explanatory diagram showing several kinds of orientation codes for the light pattern.
FIG. 10 is an explanatory diagram showing the picture memory which is coded by means of the orientation codes.

These codes are applied to the windows W1, W2 of the picture data shown in FIG. 7, and then the picture is coded.

Now, the following values H and V are obtained by carrying out the following summing operation.

$$H = \Sigma(HORI[-]) + \Sigma(SLOR[)]) + \Sigma(SLOL[(]) + \Sigma(VERT[I]) \qquad (7)$$

$$V = \Sigma(SLOR[)]) + \Sigma(SLOL[(]) \qquad (8)$$

From these, the angle $\theta_0$ made by the axis X and the projected lines of light pattern 9, 10 on the plane XY is given by $$\theta_0 = \tan^{-1}\frac{V}{H} \tag{9}$$

Figure 6:
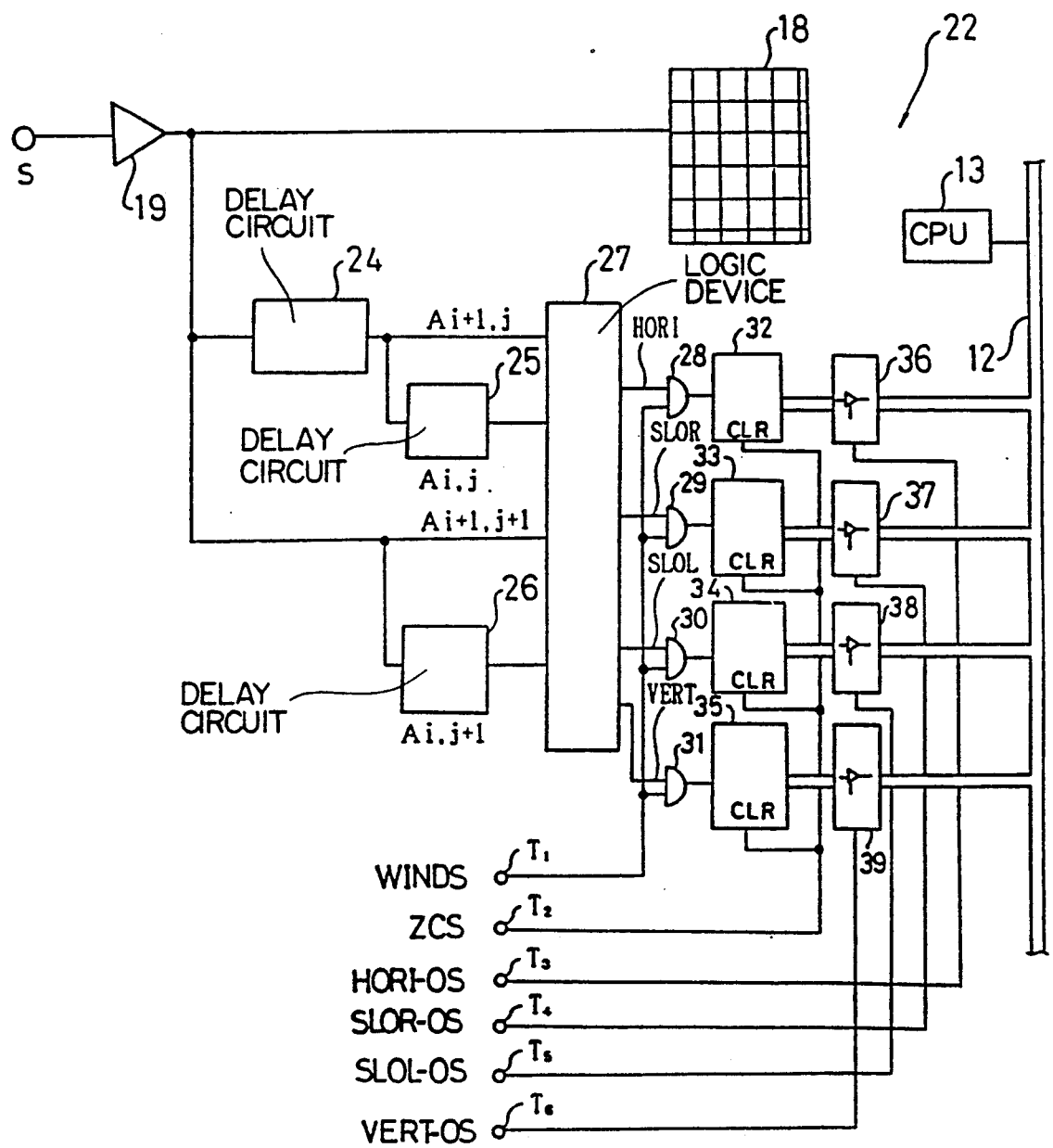
FIG. 6 is a block diagram showing the make-up of another image processor.

In FIG. 6, the block diagram shows the make-up of the image processor 22 for carrying out the above-mentioned coding and processing of equations (7), (8), and (9).

The image processor 22 is provided with a logic 27 which produces the orientation codes from the output signals received from the two-value converting circuit 19 shown in FIG. 4 through a 1 line delay circuit 24 and 1 dot delay circuits 25, 26. The image processor 22 is also provided with a terminal $T_1$ from which a discriminating signal WINDS, which means that the image is within the windows $W_1$, $W_2$, is inputted, a terminal $T_2$ from which zero resetting signals for adders are inputted, and terminals $T_3$, $T_4$, $T_5$, and $T_6$ from which bus output signals HORI-OS, SLOR-OS, SLOL-OS, and VERT-OS, which are respectively resultant values of summing of HORI, SLOR, SLOL, and VERT, are respectively inputted.

The image processor is further provided with AND gates 28, 29, 30, and 31 which output, in accordance with the discriminating signals WINDS, the signals HORI, SLOR, SLOL, and VERT received from the orientation codes producing logic 27, adders 32, 33, 34, and 35 for adding outputs from the AND gates, and gates 36, 37, 38, and 39 for giving outputs of each adder, in accordance with each bus output signal, to a bus 12. Resetting terminals of the adder 32, 33, 34, and 35 are connected to the terminal $T_2$.

A CPU 13 carries out calculation of equation (9) from the obtained data to know the angle $\theta_0$ formed by the axis X and projected lines of the light pattern 9, 10 on the plane XY.

Figure 11:
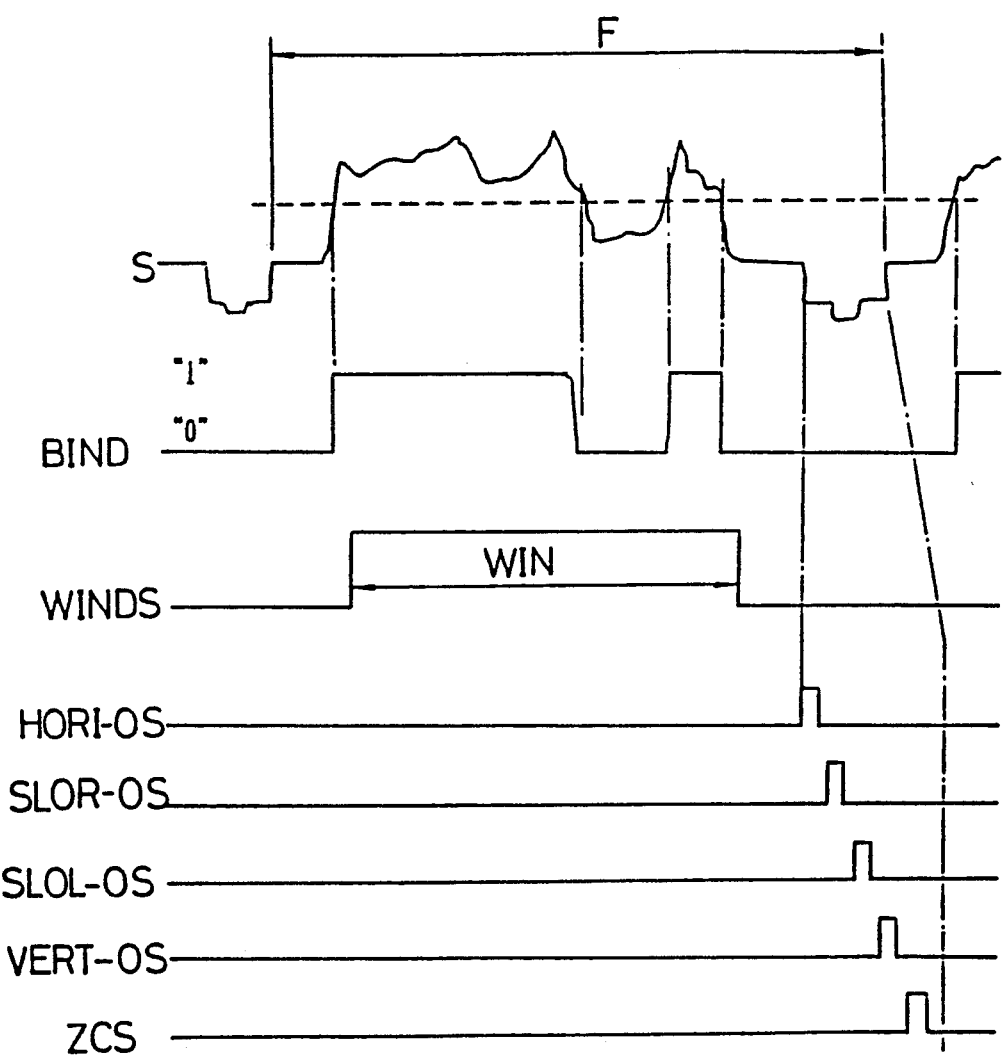
FIG. 11 is a timing chart showing a method for processing image signals in the image processor.

In FIG. 11, the timing chart shows all signals of the image processor 22 described above. As shown in the drawing, the picture signal S of one frame F is two-valued data BIND (1,0), and after the discriminating signal WINDS has been inputted, the resultant bus output signals HORI-OS, SLOR-OS, SLOL-OS, and VERT-OS of HORI, SLOR, SLOL, and VERT are outputted in turn, and then the zero resetting signals ZCS for the adders are outputted.

In the above image processor 22, processing is carried out with extremely high speed, since the CPU 13 only carries out the calculation of the equation (9), and processing other than the calculation is carried out by the hardware. This is important in the meaning that the angle is measured in real time, and therefore the machining speed is kept without reduction.

Now, composition of the angle measuring device is explained.

Figure 12:
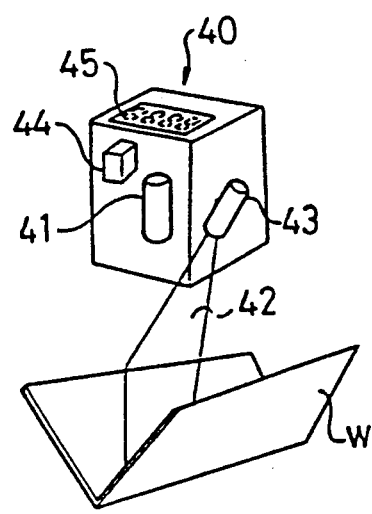
FIG. 12 is a perspective view of an image pickup device provided with a CCD camera and a light emitting laser diode which is used for the present invention.

In FIG. 12, a measuring device 40 is in the shape of a small box to which a micro-CCD camera 41, a laser diode 43 to emit slit light 42, a pickup circuit 44, and an indicator 45 to indicate measured angles on the top surface of the box are attached. The camera 41 is so positioned as to pick up a picture below the camera in focus. The laser diode 43 is so disposed as to emit the slit light 42 towards the focus of the camera 41 at the angle of 45° with the pickup direction of the camera 41, so that a linear light pattern is induced on the surface of a work W. The pickup circuit 44, which is switched on and prepared to pick up images, watches the light pattern, picks up pictures for measuring a formed angle of the work W when parts of the light pattern passes through a pickup axis, and sends picture signals to such an image processor shown in FIG. 4 or 6.

The device or box 40 may be provided with a grip section (not shown) for carrying. In this case, it is preferred that the grip section is provided with a switch for operation, and that the pickup circuit 44 is provided with a discriminating circuit which causes the pickup circuit 44 to pick up the picture automatically when the light pattern comes to the focal position of the camera 41 according to the operation for the vertical movement.

In the above constitution, the angle measuring device can measure the angle from the equations (1)–(6).

Figure 13:
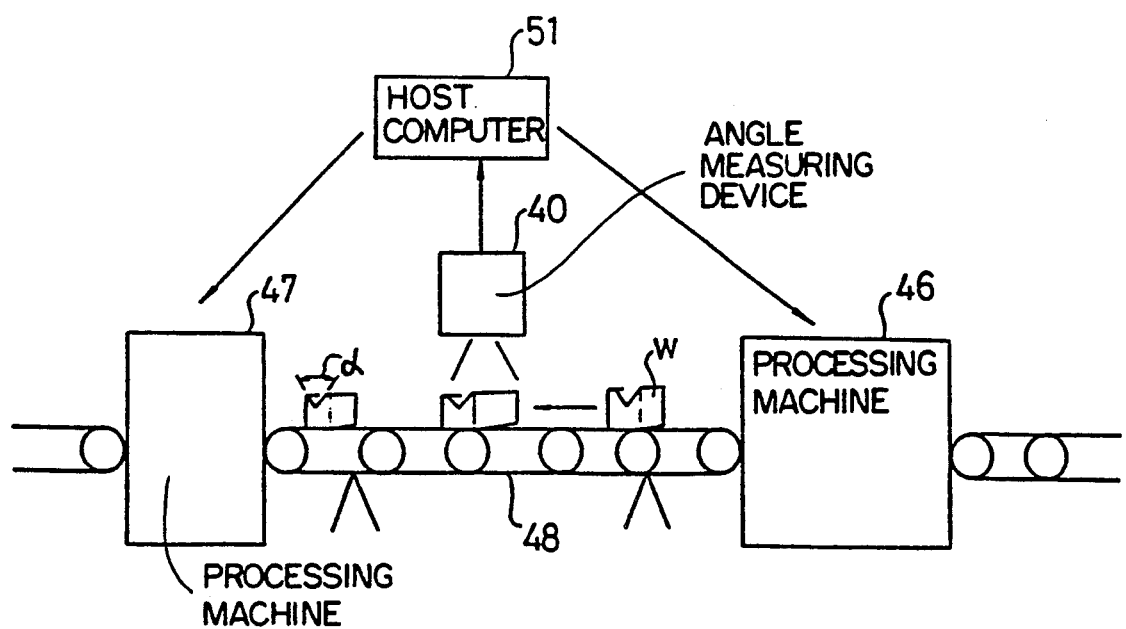
FIG. 13 is an explanatory diagram showing an example of measuring the angle of workpieces along a processing line.

In FIG. 13, the angle measuring device of FIG. 12 is used for measuring an angle of a product W which has a V-shaped cross section. In order to measure an angle $\alpha$ of the works W which are being transported on a belt conveyer 48 between two processing machines 46 and 47, the angle measuring device 40 of FIG. 12 is fixed above the belt conveyer, and the processing machines 46, 47 and the angle measuring device 40 are connected to a host computer 51. The host computer 51 gives an order for processing to the processing machine 46 and an order for supplementary processing to the other processing machine 47 as a result of measuring of the angle by the angle measuring device 40.

In the examples shown in FIGS. 12 and 13, the angle $\alpha$ of the work W is measured by emitting plane light onto the upper surface of the work W. However, a pair of pickup devices each provided with a camera and a light emitting diode may be used in order to obtain inclinations of two surfaces of the work W with the pickup directions of the cameras respectively, and therefore by summing the inclinations the angle $\alpha$ formed by the two surfaces. In this case, generally the pickup directions of the pickup devices are arranged to be parallel. However, even in the case that the directions are angled, the angle $\alpha$ is obtained from the relation of the directions if the relation is known.

In FIGS. 14–18, an example is shown where the pickup device of the measuring device for measuring the bending angle of a workpiece is attached to a punch 106 of a bending machine 101.

First, description is made about the general structure and function of the bending machine 101 used for execution of the present invention. As shown in the front view of FIG. 15, the bending machine 101 has two C-shaped side frames 102, which look like C's when seen from the left side like side frames shown in FIG. 23, and lower and upper frames 103, 104. The lower and upper frames 103, 104 connect respectively the upper parts and the lower parts of the two side frames 102. On the upper part of the lower frame 103 a die 105 extending to the right and left is mounted through a die holder (not shown), while a punch 106 is attached to the upper frame 104 through a ram attached movably vertically to the upper frame 104. The punch 106 cooperates with the die 105 to bend a work sheet.

Two cylinders SyR, SyL are disposed on the both ends of the ram and connected to the ram through ball bearings. The punch 106 is operated to move toward and away from the die 105 by activating the cylinders SyR, SyL. The operation of the punch 106, or the cylinders SyR, SyL is carried out by controlling the position of the ram by detecting a linear scale disposed inside of the side frame 102 by means of a rotary encoder (not shown) attached to a side of the ram. The operating axis of the ram, which is called a depth (D) axis, is to control the position of the ram by an electrohydraulic servo circuit (not shown).

As an example of the position controlling method of the ram where a speed pattern previously designed is used, the punch 106 is lowered with high speed until the tip of the punch 106 comes near to a work sheet placed on the die 105, then with low speed until the work sheet is bent to reach nearly a desired bending angle, and finally lowered with lower speed until the tip reaches a final position predetermined by taking spring back of the work sheet into consideration and then raised.

An arm 107 is attached to the left part of the upper frame 104 rotatably in a horizontal plane, and a pendant 108 serving as an operating panel is suspended from free end of the arm 107. The pendant 108 is provided with an indicator and several operation keys. In addition, a NC control panel (not shown) is disposed on the left side in FIG. 15.

Now, the bending machine 101 is described in detail. A pair of pick up devices 109 are attached to front and rear sides of the punch 106 of the bending machine 101 and connected through power supply wires 111 and signal wires 112 to an image processor 110 installed on the floor. An indicator 113 and some necessary operating keys are disposed on a surface of the image processor 110. The image processor is connected with the NC control panel.

The detail of the pickup device 109 is shown in FIG. 14. The pair of pickup devices 109 are indicated by references $109_F$, $109_B$ in FIG. 14. Similarly, the wires 111, 112 are respectively indicated by $111_F$, $111_B$ and $112_F$, $112_B$ in the drawing. Each of the pickup devices $109_F$, $109_B$ is provided with a laser diode 114 for emitting slit light, which is plane light, toward an upper surface of a work sheet and with a visual sensor 115 having a CCD area sensor for picking up a line pattern of light induced on the surface of the work sheet by the slit light.

Figure 16:
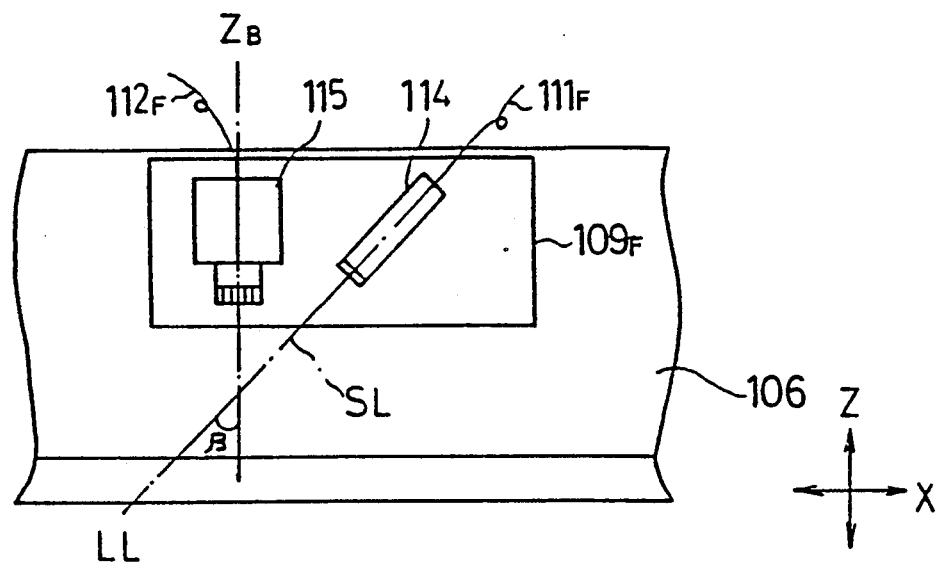
FIG. 16 is a front vie of FIG. 14.
Figure 17:
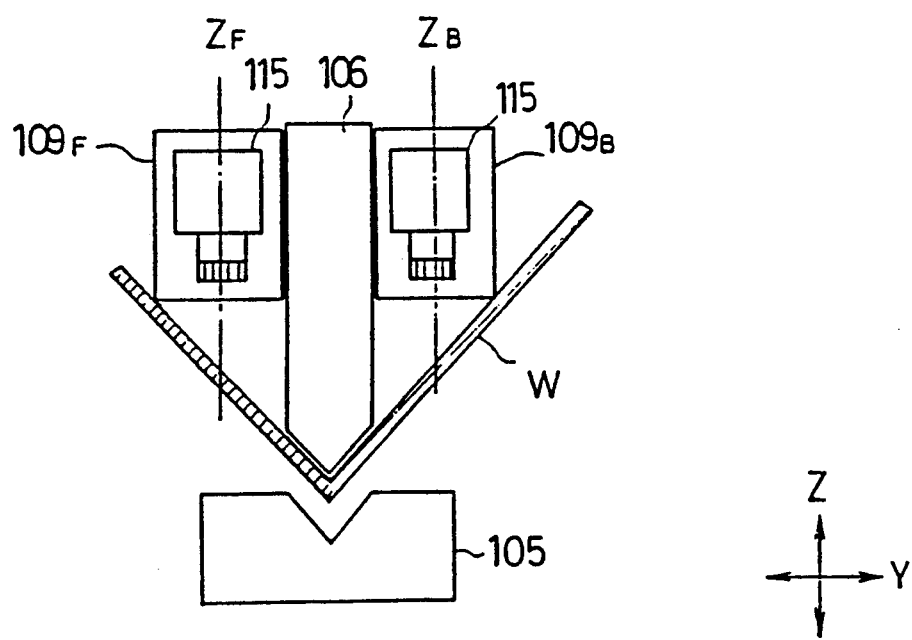
FIG. 17 is a right elevation of FIG. 14.

In FIGS. 16 and 17 which are respectively front and right elevational views of the pickup device 109, the visual sensors 115 are disposed vertically. The sensors 115 pick up the light patterns induced on the upper surfaces of the work sheet W. In the drawings, Cartesian coordinates X, Y, and Z are used. The vertical axes $Z_F$, $Z_B$ of the pickup devices $109_F$, $109_B$ are parallel to each other. Each slit light SL is at an angle of $\beta$ with the vertical axis $Z_F$ or $Z_B$.

FIG. 18 is an explanatory drawing showing the state of attachment of the pickup devices by modeling the relation of FIG. 17. The angle formed by the two surfaces of the work sheet W is obtained as explained above with reference to FIGS. 1 and 3. The light patterns induced on the left and right leaves of the work sheet W are respectively picked up on the area sensors of the visual sensors of the pickup devices $109_F$ and $109_B$. The angle is measured as shown in the flow chart of FIG. 5. The NC device (FIG. 4) into which the measured angle is inputted can automatically carry out bending operation similarly by using a controlling method described in the above Japanese Patent 63-2687 (B). In other words, a present bending angle $\alpha$ is inputted into the NC device 21, and then the NC device controls the position of the punch 106 so that the desired bending angle $\alpha_0$ is obtained after spring back.

The bending angle $\alpha$ measured in this example is not that obtained from a pattern on a part near the edge of the work sheet W, but is obtained from a pattern on inner parts of the work sheet. Hence, the measured bending angle $\alpha$ can be treated as an actual bending angle, and this is advantageous over the prior art.

Figure 19:
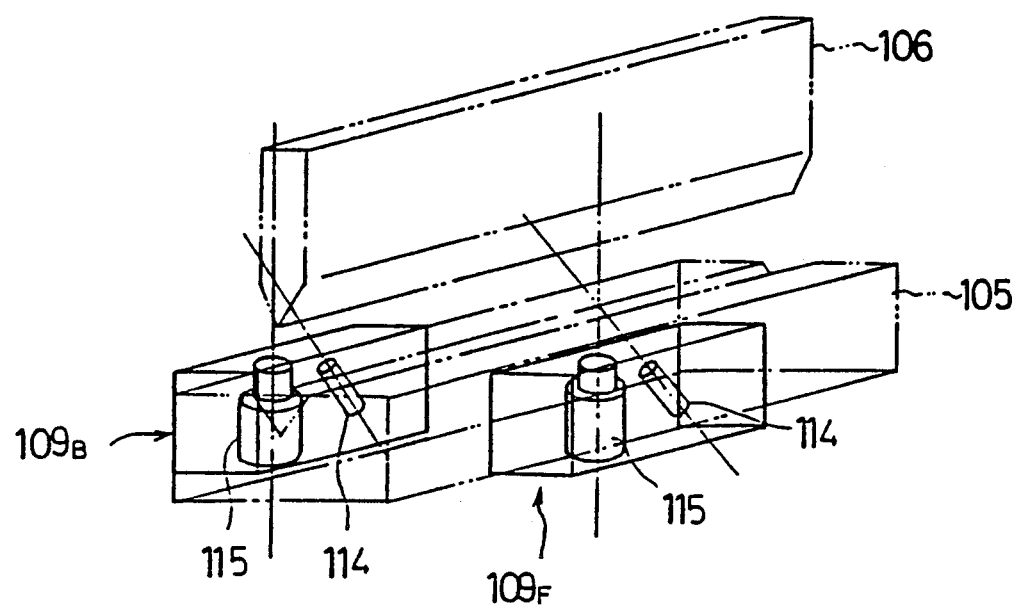
FIG. 19 is a perspective view showing another example of attaching of the light emitting and image pickup devices.
Figure 20:
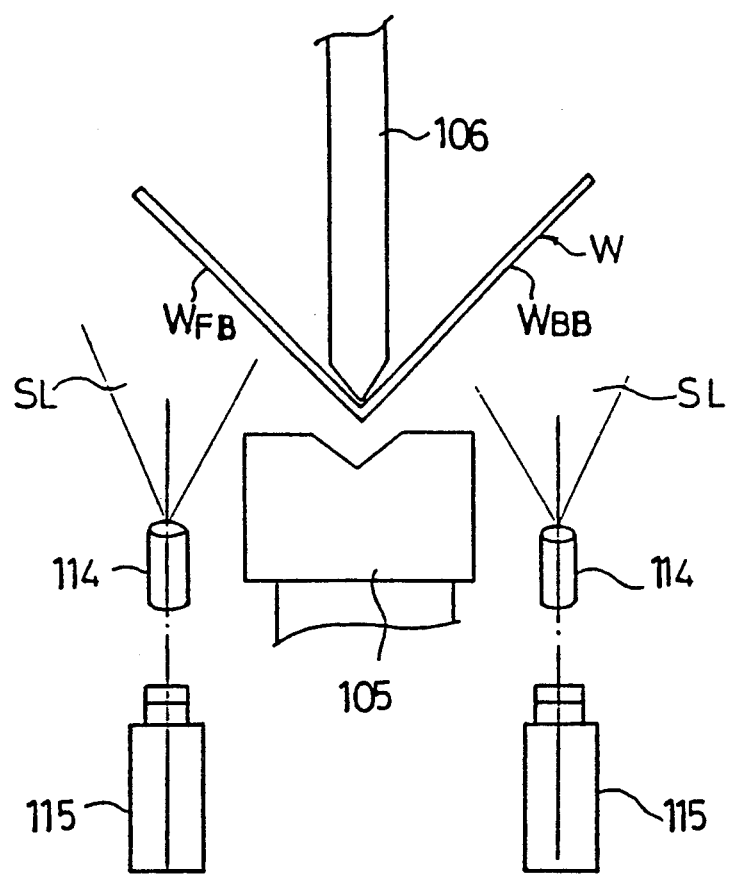
FIG. 20 is a diagram modeled from FIG. 19.

In FIG. 19, another example is shown where the pair of pickup devices $109_F$, $109_B$ are attached to the front and rear parts of the die 105. FIG. 20 is a right elevation of FIG. 19 and is modeled from FIG. 19. References $W_{FB}$, $W_{BB}$ in FIG. 20 indicate respectively lower surfaces of the front and rear leaves of the work sheet W. In this case also, inclinations of the light patterns with pickup directions are measured in the same manner as of FIG. 14, and then the bending angle $\alpha$ is obtained.

Figure 21:
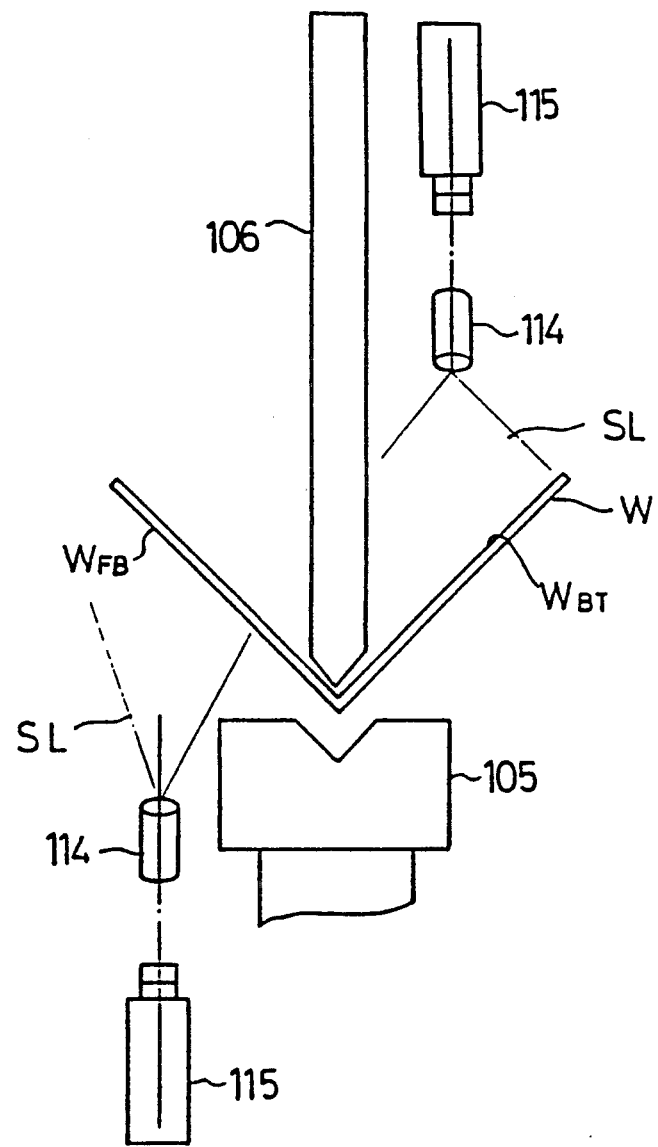
FIG. 21 is a diagram showing a further example of attaching of the light emitting and image pickup devices.

In a further model shown in FIG. 21, the pair of pickup devices are attached to the rear part of the punch and the front part of the die, and the bending angle $\alpha$ is obtained by picking up light patterns induced on the upper surface of the rear leaf and the lower surface of the front leaf of the work sheet W.

In the above examples, the pickup devices 109 ($109_F$, $109_B$) are attached fixedly to the punch and/or die directly, however these may be fixed to a punch or die holder, or the frames, or may be attached to those movably.

As an example of the movable pickup device 109, the pickup device can be moved vertically when picking up the pattern and/or horizontally in the longitudinal direction of the work sheet W.

In addition, several pairs of the pickup devices may be mounted on the bending machine in order to measure bending angles of the work sheet W at several places, and a mean value of the angles may be used as a representative bending angle.

Figure 22:
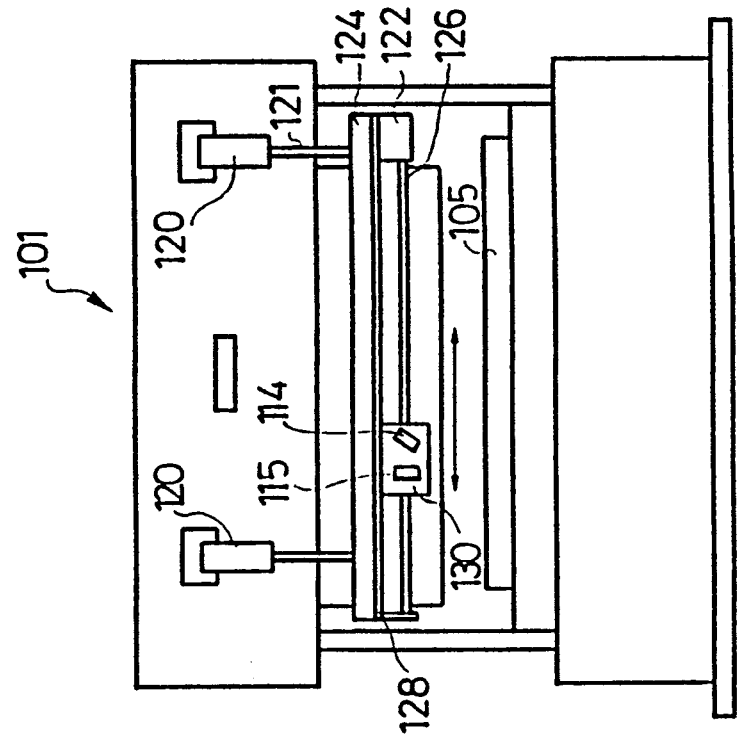
FIG. 22 is a front view of a bending machine to an upper part of which movable light emitting and image pickup devices are attached.
Figure 23:
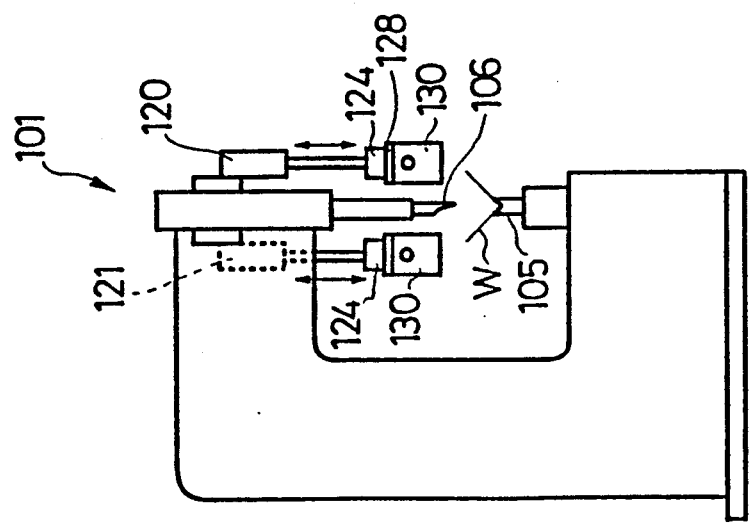
FIG. 23 is a left elevation of FIG. 22.

In FIGS. 22 and 23, an example is shown where a pair of units 130 each having a light emitting device 114 and a CCD camera 115 are attached to the bending machine 101. The unit 130 is slidably mounted on a guide 128 attached to a horizontal bar 124 extending in a direction parallel to a bending axis of the bending machine 101. The unit 130 moves in the direction along a ball screw 126 rotated by a motor 122. The horizontal bar 124 is suspended from the upper part of the bending machine 101 through hydraulic cylinders 120 and cylinder rods 121 of the cylinders 120 so that the bar 124 or the unit 130 can move vertically. Thus, the unit 130 can be moved upwards away from the work sheet W when the unit hinders the work sheet W and is moved toward the work sheet when emitting light and picking up the light pattern. Furthermore, the unit 130 can measure bending angles of any parts of the work sheet since the unit can move in the direction parallel to the bending axis.

In this example, a pair of the units are disposed on the machine, however some pairs of the unit may be mounted in order to measure the bending angles at some places at the same time.

Figure 24:
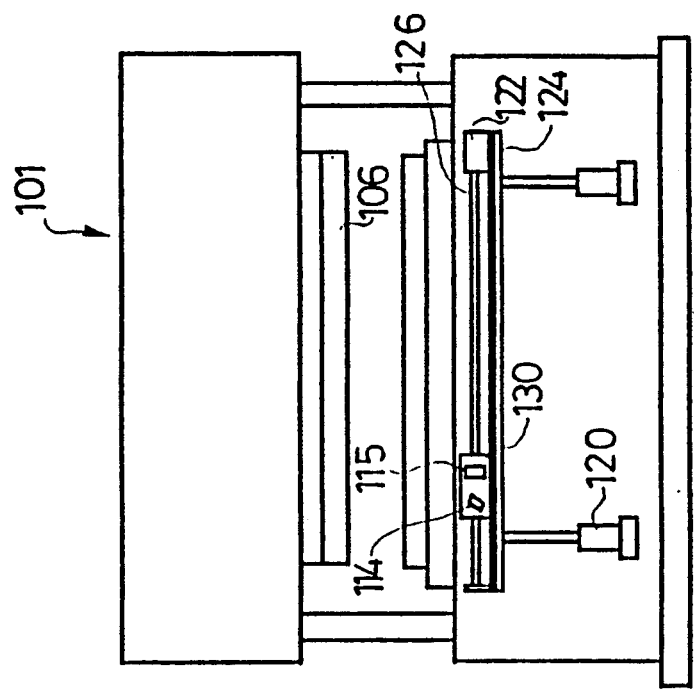
FIG. 24 is a front view of a bending machine to a lower part of which movable light emitting and image pickup devices are attached.
Figure 25:
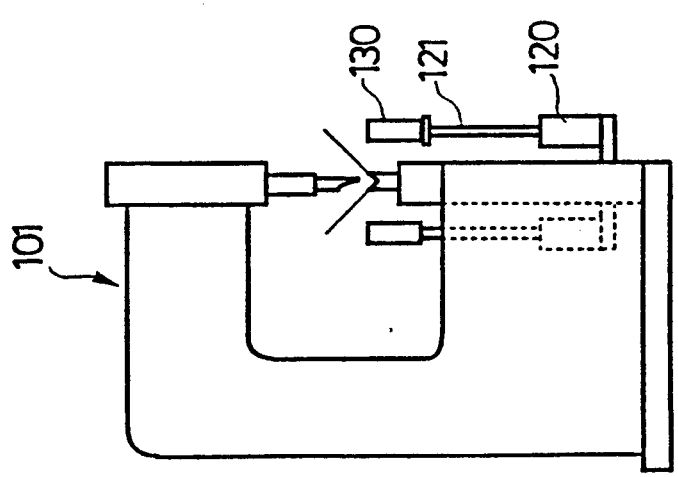
FIG. 25 is a left elevation of FIG. 24.

In FIGS. 24 and 25, another example is shown where a pair of the units 130 are attached to the bending machine 101 in a similar way to FIGS. 22 and 23. Only one different point is that the units are attached to the lower part of the bending machine so that the CCD camera 115 can pick up the light pattern induced on the lower surface of the work sheet by emission of light by the light emitting device 114. In the drawings, therefore the same reference numerals are used for the members as in FIGS. 24 and 25.

Figure 26A:
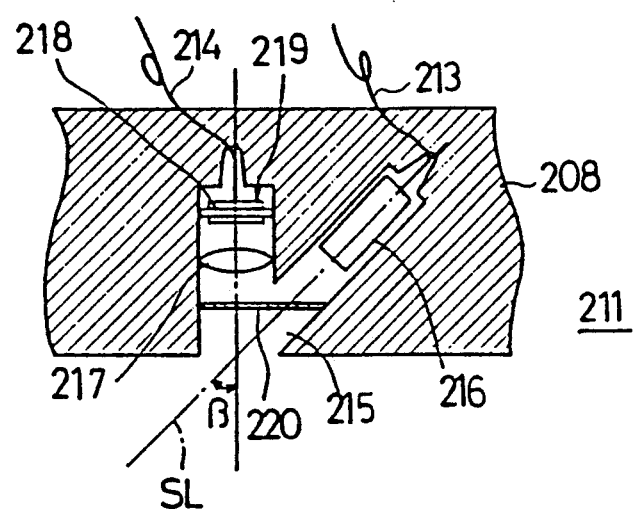
FIG. 26a and 26b are sectional views showing an example in which an image pickup device of a measuring device of the present invention for measuring a folding angle of a work is disposed in a punch of a bending machine.
Figure 26B:
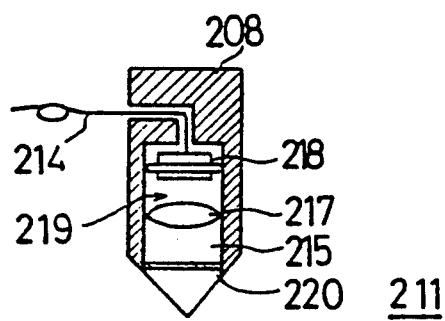
Figure 27:
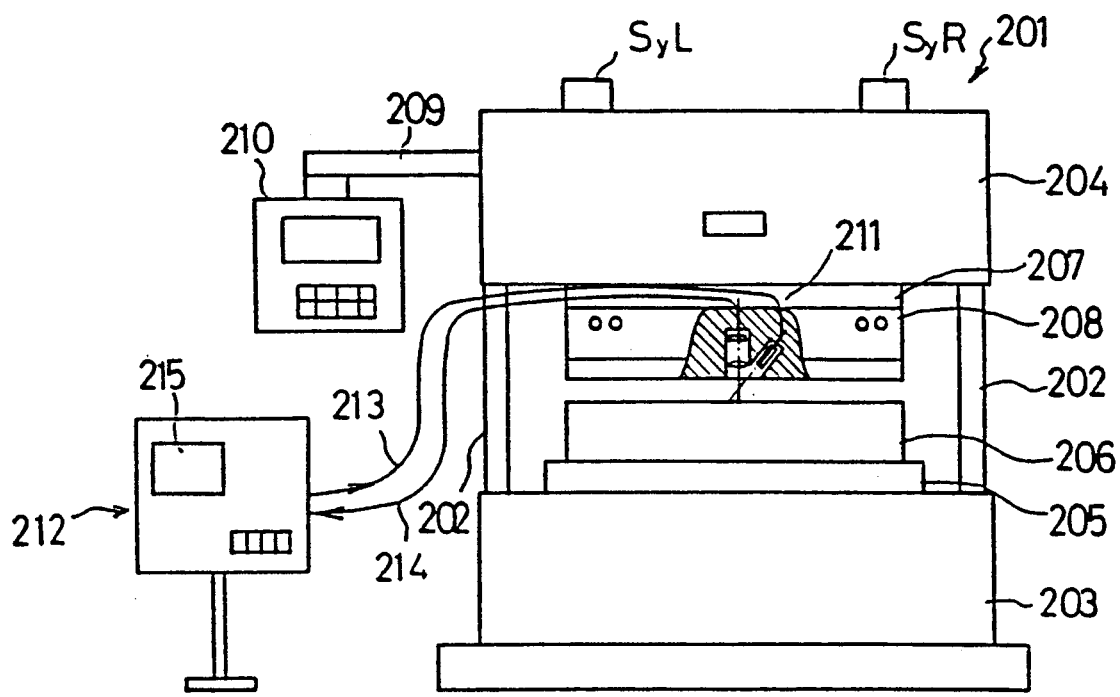
FIG. 27 is a front view of a bending machine provided with a measuring device of the present invention for measuring a folding angle of a work.
Figure 28:
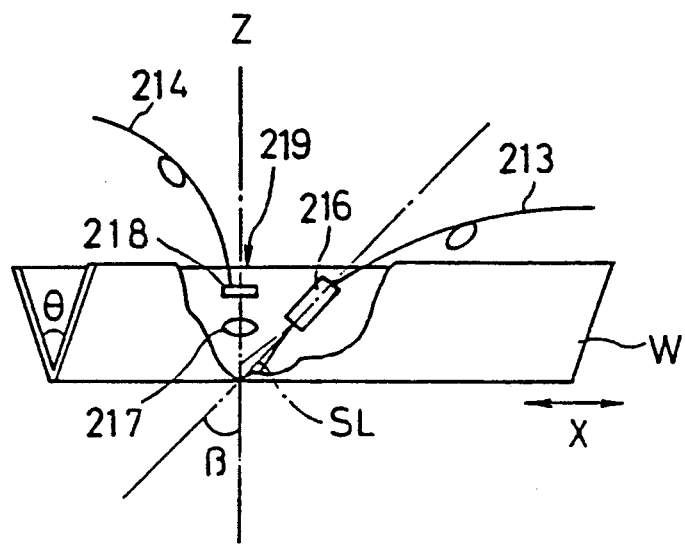
FIG. 28 is an explanatory perspective view showing the device modeled from that shown in FIGS. 26a and 26b.

In FIGS. 26-28, an example is shown where the pickup device of the measuring device of the present invention for measuring the bending angle of a workpiece is attached to a punch 208 of a bending machine 201.

First, description is made about the general structure and function of the bending machine 201 used for execution of the present invention. As shown in the front view of FIG. 27, the bending machine 201 has two C-shaped side frames 202 and a lower and an upper frames 203, 204. The lower and upper frames 203, 204 connect respectively the upper parts and the lower parts of the two side frames 202. On the upper part of the lower frame 203 a die 206 extending to the right and left is mounted through a die holder 205, while a punch 208 is attached to the upper frame 204 through a ram 207 attached movably vertically to the upper frame 204. The punch 208 cooperates with the die 206 to bend a work sheet.

Two cylinders SyR, SyL are disposed on the both ends of the ram 207 and connected to the ram 207 through ball bearings. The punch 208 is operated to move toward and away from the die 206 by activating the cylinders SyR, SyL. The operation of the punch 208, or the cylinders SyR, SyL is carried out by controlling the position of the ram 207 by detecting a linear scale disposed inside of the side frame 202 by means of a rotary encoder (not shown) attached to a side of the ram 207. The operating axis of the ram, which is called a depth (D) axis, is to control the position of the ram 207 by an electrohydraulic servo circuit (not shown).

As an example of the position controlling method of the ram where a speed pattern previously designed is used, the punch 208 is lowered with high speed until the tip of the punch 208 comes near to a work sheet placed on the die 206, then with low speed until the work sheet is bent to reach nearly a desired bending angle, and finally lowered with lower speed until the tip reaches a final position predetermined by taking spring back of the work sheet into consideration and then raised.

An arm 209 is attached to the left part of the upper frame 204 rotatably in a horizontal plane, and a pendant 210 serving as an operating panel is suspended from free end of the arm 209. The pendant 210 is provided with an indicator and several operation keys. In addition, a NC control panel containing a NC device (not shown) is disposed on the left side or another appropriate place in FIG. 27.

Now, the bending machine 201 is described in detail. A pickup device 211 is embedded in the central part of the punch 208 of the bending machine 201 and connected through a power supply wire 213 and a signal wire 214 to an image processor 212 placed on the floor. An angle indicator 215 and some operating keys are arranged on the face of the image processor 212. The image processor 212 is connected with the NC device disposed in the NC control panel.

The detail of the pickup device 211 is shown in FIGS. 26a and 26b. FIG. 26a is a front view, and FIG. 26b is a central cross sectional view of FIG. 26a taken from the right side.

As shown in the drawings, the pickup device 211 has a laser diode 216 and a visual sensor 219 which are disposed in a hole section 215 provided in the punch 208. The laser diode 216 emits slit light SL, which is plane light, toward an upper surface of a work sheet to be bent. The visual sensor 219 has a lens 217 and a CCD area sensor 218, and picks up line patterns induced on the upper surface of the work sheet. For dust proofing, a filter 220 is attached to the lower portion of the hole section 215.

In FIG. 28, the optical model of the pickup device 211 is shown. The visual sensor 219 is arranged on a vertical axis Z so that the sensor 219 can pickup the light patterns on the surface of the work sheet right under the sensor.

The slit light SL is at an angle of $\beta$ with the vertical axis Z as shown in FIG. 26a.

Figure 29:
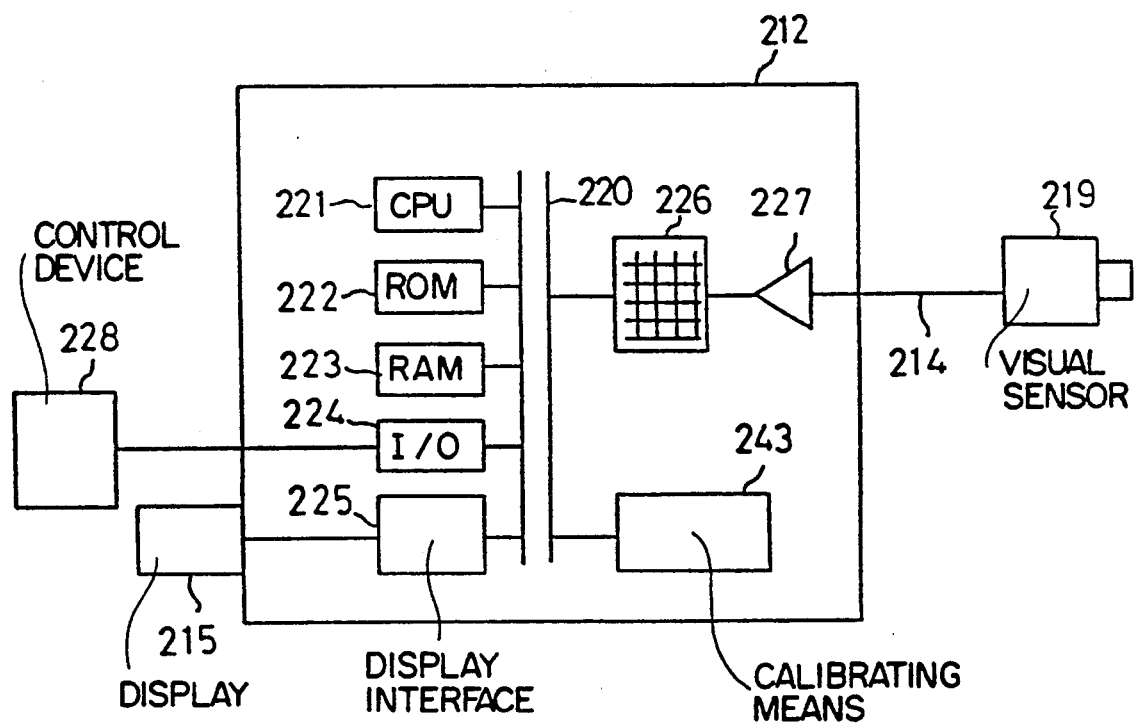
FIG. 29 is a block diagram of an image processor.

In FIG. 29, the block diagram shows the internal composition of the image processor 212 which is connected to the visual sensor 219.

The image processor 212, in this example, has a system bus 220 to which a CPU 221, ROM 222, RAM 223, input/output (I/O) device 224, display interface 225, and picture memory 226 are connected. To the I/O device 224 the NC device 228 in the NC control panel is connected, while to the display interface 225 the indicator 215 is connected. To the picture memory 226 a two-value converting circuit (A/D converter) 227 is connected for converting image signals of the visual sensor 219 into two-valued signals.

In the above composition, the picture picked up by the visual sensor 219 is sent to the picture memory 226, and in the CPU 221 processing of FIG. 5 is carried out to obtain the inclinations $\alpha_1$ and $\alpha_2$ (FIG. 3c) and therefore the resultant bending angle $\alpha$ which is sent to the indicator 215 or the NC device 228.

Figure 30:
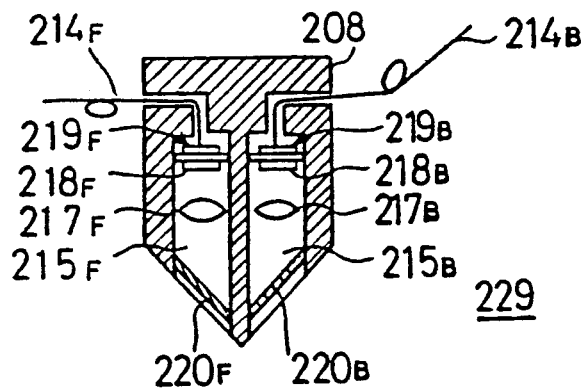
FIG. 30 is a sectional view showing a further example of the image pickup device disposed in the punch.

In FIG. 30, another example is shown where two hole sections $215_F$, $215_B$ are formed in the punch 208. The hole sections $214_F$, $214_B$ are positioned on the right and left sides of the bending axis. A pickup device 229 is disposed in the hole sections $214_F$, $214_B$. The pickup device 229 includes lenses $217_F$, $217_B$, visual sensors $219_F$, $219_B$ each provided with a CCD area sensor $218_F$ or $218_B$, and protecting filters $220_F$, $220_B$ attached to the lower parts of the punch 208. Diodes for the visual sensors $219_F$, $219_B$ are omitted here in the drawing. Only one diode may be used for the visual sensors. In this example, the bending angle $\alpha$ is obtained by using the principle described above and shown in FIGS. 2 and 3.

Figure 31A:
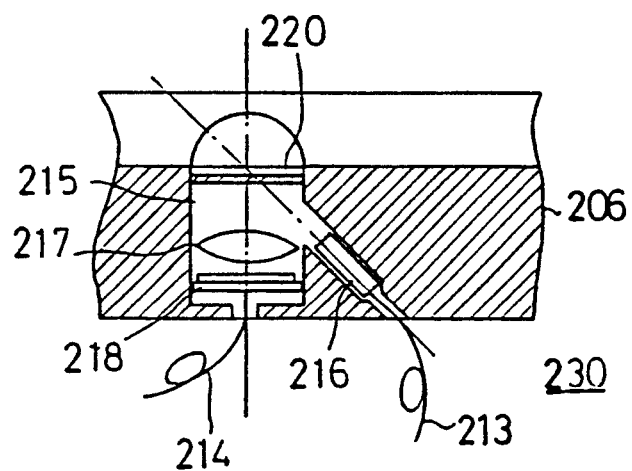
FIGS. 31a and 31b are respectively sectional front and right side views showing an example where a pickup device is disposed in a die of a bending machine.
Figure 31B:
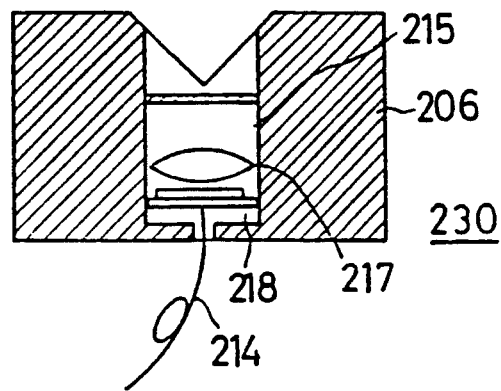
Figure 32:
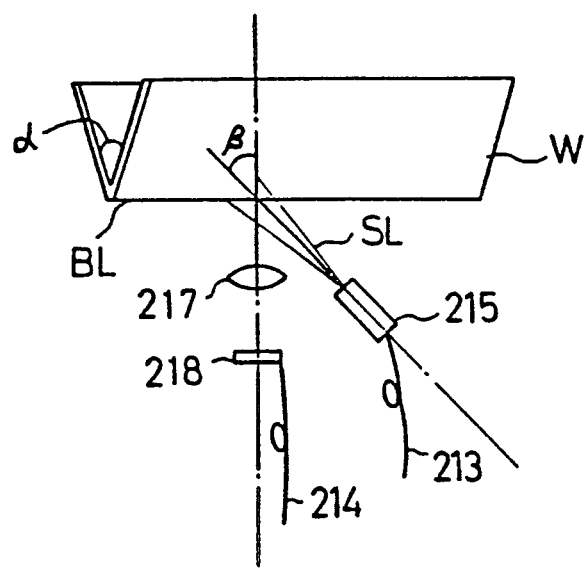
FIG. 32 is an explanatory perspective view showing the device modeled from that in FIG. 26.

In FIGS. 31a and 31b, a further example is shown where a pickup device 230 is disposed in the die 206. FIG. 31a is a front view of the pickup device 230, and FIG. 31b is a central sectional view of FIG. 31a taken from the right side. The pickup device 230 includes a laser diode 216, a lens 217 and a CCD area sensor 218 which are disposed in a hole section 215 as similarly as in FIGS. 26a and 26b. In this example, the bending angle $\alpha$ is obtained from the relations shown in FIG. 32 by detecting light patterns on lower surfaces of the work sheet W which are in the front and rear of a bending line BL.

Figure 33:
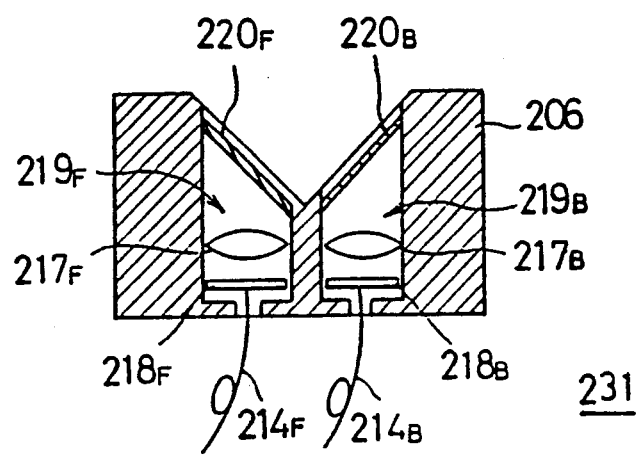
FIG. 33 is a sectional right view showing another example where a pickup device is disposed in a die of a bending machine.

In FIG. 33, an example is shown where a pickup device 231 including a pair of visual sensors $219_F$, $219_B$ is provided in the die 206. The visual sensors $219_F$, $219_B$ are positioned in the front and rear of the bending line. In this example, the bending angle $\alpha$ is obtained from the principle as similarly as in FIG. 31. However, the visual sensors are set in any pickup directions, and therefore offset for the shift of the pickup directions must be given to the summing value of the inclinations $\alpha_1$ and $\alpha_2$.

Figure 34A:
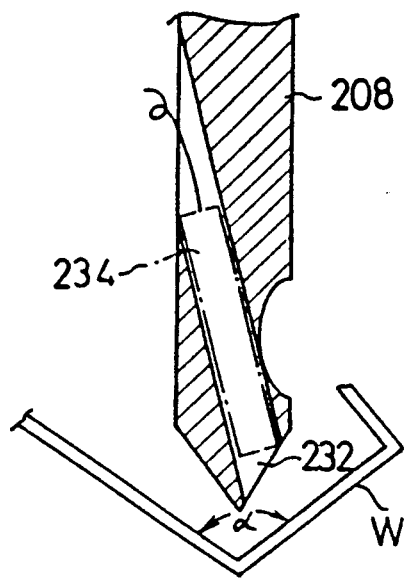
FIGS. 34a and 34b are sectional right views showing an example where a pickup unit is attached to a punch.
Figure 34B:
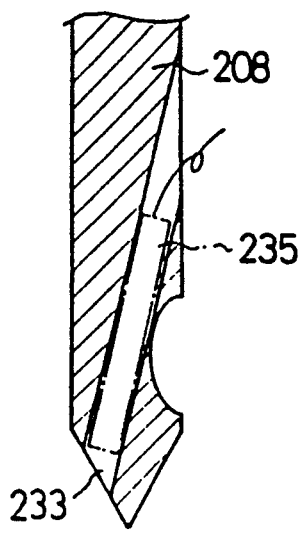

In FIGS. 34a and 34b, an example is shown where two pickup units 234, 235 are disposed in holes 232, 233 formed at different places of the punch 208. The holes 232, 233 are formed diagonally through the punch. One of the holes 233 is at an angle clockwise, and the other 232 is at an angle anticlockwise. The pickup units 234, 235 in the holes 232, 233 pick up light patterns on the two surfaces of the bent work sheet W in the front and rear of the bending line. The bending angle $\alpha$ is obtained similarly in the way mentioned above. In this example, it is no necessary to incorporate the pickup units into all the punches or dies for use since the units are attachable to the holes formed in the every punch or die. This causes cost saving.

As a modified example of this case, only one hole may be formed in the punch 208, and one pickup device is disposed in the hole. Further, the hole or holes need not be formed through the tool (punch and die) and may be notches.

Figure 35:
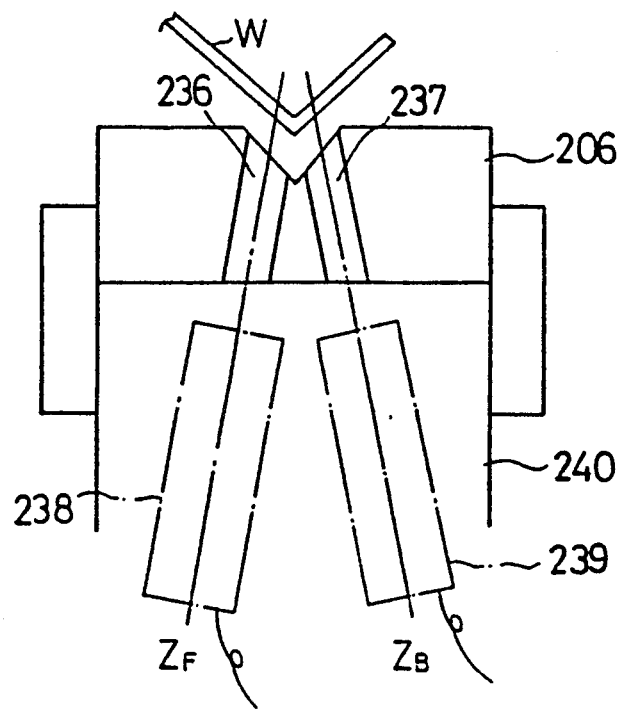
FIG. 35 is a sectional right view showing an example where a pickup unit is attached to a die.

In FIG. 35, an example is shown where pickup units 238, 239 are embedded in the die holder 240 so that the units 238, 239 can pick up light patterns on the lower surfaces of the work sheet W through holes 236, 237 formed in the die 206. This example is applied to many bending cases, since only small holes are formed in the die 206. In this example, only one hole may be formed in the die and die holder as same as the above.

Figure 36:
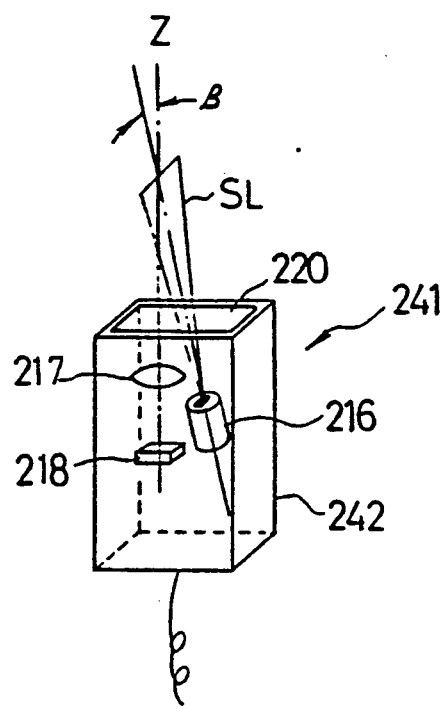
FIG. 36 is an explanatory perspective view showing the make-up of the pickup unit shown in FIGS. 34 and 35.

In FIG. 36, the composition of the pickup unit 241 (234, 235, 238, 239 in FIGS. 34 and 35) used in FIGS. 34 and 35 is shown as an example. The pickup unit 241 has a box-like case 242 in which a laser diode 216 for emitting slit light SL, a lens 217, and a CCD camera 218 are arranged to be so related to one another as shown in FIG. 3. The angle $\beta$ is preferred to be 10°–20° in order to make the case 242 be compact one. The unit 241 is used being attached to or embedded in the tools (punches and dies) or tool holders.

Here, a problem may arise about precision of attaching of the unit to a tool. However, low precision may be allowed. Because, the image processor may be provided with calibrating means 243 by which a measuring error is easily calibrated by setting a sample piece of a known angle in the bending machine and measuring the angle of the sample piece.

Figure 37:
FIG. 37 is a perspective view of a bent work sheet in which center flexure phenomenon has been occurred.

A plurality of the units may be used at several places in order to measure center flexure phenomenon shown in FIG. 37 and determine the quantity of shims. In case that the bending machine has a central cylinder, quantity of shims are also determined.

This invention is not limitative to the examples described above, and is executed in modified or combined forms.

INDUSTRIAL APPLICABILITY

As described above in detail, the angle of the work is measured with precision according to the method and the device for measuring angles of the present invention, and the device is used for a bending machine in order to measure the bending angle of the work sheet.

We claim:

1. A method for measuring an angle $\alpha$ formed by two surfaces of a work, comprising the steps of:
    emitting light in at least a direction toward the two surfaces for inducing linear light patterns on the two surfaces;
    picking up the light patterns on the two surfaces in a pickup direction and onto a coordinate plane as an image, the pickup direction having predetermined positional relations with the two surfaces and the direction of the emitted light; and
    obtaining inclinations $\alpha_1$, $\alpha_2$ of the two surfaces with respect to the pickup direction based on angles $\theta_1$, $\theta_2$ of the linear light patterns picked up on the coordinate plane with respect to a coordinate axis of the coordinate plane.

2. The method of claim 1, wherein the angles $\theta_1$, $\theta_2$ of the linear light patterns picked up on the coordinate plane with the coordinate axis are obtained by processing the image.

3. The method of claim 1, wherein angles made by the directions of the emitted light and the pickup direction are given by $\beta_1$, $\beta_2$, and by using the angles $\theta_1$, $\theta_2$ of the linear light patterns with a coordinate axis, the inclinations $\alpha_1$, $\alpha_2$ of the two surfaces are obtained by $$\alpha_1 = \tan^{-1}(\tan\theta_1 \cdot \tan\beta_1)$$

$$\alpha_2 = \tan^{-1}(\tan\theta_2 \cdot \tan\beta_2)$$

and wherein the angle formed by the two surfaces is obtained by $$\alpha = \alpha_1 + \alpha_2.$$

4. The method of claim 3, wherein $\beta_1 = \beta_2 = 45°$ and the inclinations $\alpha_1$, $\alpha_2$ are given by $$\alpha_1 = \theta_1, \alpha_2 = \theta_2.$$

5. The method of claim 1, wherein the light patterns on the two surfaces are picked up by two cameras, and the inclination is obtained for each of the light patterns picked up.

6. The method of claim 1, wherein the light is emitted to a plurality of sections of the two surfaces of the work, the sections being along a longitudinal axis of the work, and the angle formed by the two surfaces is obtained for every section.

7. The method of claim 6, wherein the sections are changeable by moving the position of light, and the angle formed by the two surfaces is obtained for required sections.

8. The method of claim 6, wherein a mean value of the angles formed by the two surfaces, detected at the plurality of sections is used as a representative angle.

9. A device for measuring an angle formed by two surfaces of a work comprising:
    a light emitting device for emitting light toward the two surfaces for inducing linear light patterns on the two surfaces;
    a camera for picking up the linear light patterns on the two surfaces onto a coordinate plane as an image; and
    an image processor for processing the image and obtaining the angle.

10. A device for measuring a bending angle of a work sheet, used for a bending machine which bends the work sheet placed between a punch tool and a die tool into front and rear leaves with a bending line of the tools, comprising:
    a light emitting device, disposed in vicinity of the tools, for emitting light in a direction toward surfaces of the leaves for inducing linear light patterns on the surfaces:
    a pickup device, disposed in the vicinity of the tools, for picking up the linear light patterns on the two surfaces in a pickup direction and onto a coordinate plane as an image, the pickup direction having predetermined positional relations with the surfaces and the direction of the emitted light; and an image processor for processing the image for obtaining angles of the linear light patterns picked up on the coordinate plane with a coordinate axis.

11. The device of claim 10, wherein the light emitting device and the pickup device are movable horizontally along the tools and in a vertical direction.

12. A device for measuring a bending angle of a work sheet, used for a bending machine which bends the work sheet placed between a punch tool and a die tool into front and rear leaves with a bending line of the tools, comprising:
- a light emitting device for emitting light in a direction through a hole section formed in at least one of the tools and toward surfaces of the leaves for inducing linear light patterns on the surfaces;
- a pickup device for picking up, through the hole section, the linear light patterns in a pickup direction and onto a coordinate plane as an image, the pickup direction having predetermined positional relations with the surfaces and the direction of the emitted light; and
- an image processor for processing the image and obtaining the bending angle of the work sheet.

13. The device of claim 12, wherein the hole section is a hole formed through the tool and including a part of the bending line of the tools.

14. The device of claim 12, wherein the hole section is notches or holes disposed in front and rear of the bending line.

15. The device of claim 12, wherein the light emitting device and the pickup device are incorporated in the tool.

16. The device of claim 12, wherein the light emitting device and the pickup device are integrated into a unit, and the unit is attached to the tool detachably.

17. The device of claim 16, wherein a plurality of the units are arranged and spaced along the bending line and the units are shiftable to a desired position.

18. The device of claim 12, wherein the image processor contains means for calibrating a measured value of the bending angle by processing picture signals for a sample piece of a known angle.

19. A device for measuring a bending angle of a work sheet, used for a bending machine which bends the work sheet placed between a punch tool and a die tool into front and rear leaves with a bending line of the tools, comprising:
- a unit disposed adjacently to the tool and provided with a light emitting device for emitting light in a direction toward surfaces of the leaves for inducing linear light patterns on the two surfaces on the surfaces and with a camera for picking up the linear light patterns in a pickup direction and onto a coordinate plane as an image, the pickup direction having predetermined positional relations with the surfaces and direction of the emitted light; and
- an image processor for processing the image for obtaining the bending angle of the work sheet, wherein the unit is slidable horizontally along the bending lines of the tools and vertically.

20. The device of claim 19, wherein a pair of the units are arranged in front and rear sides of the bending line one by one.

21. The device of claim 19, wherein a plurality of the units are arranged respectively in front and rear sides of the bending line.

22. The device of claim 19, wherein the unit is slidably mounted on a horizontal bar extending in a direction parallel to the bending line, the horizontal bar being supported and moved vertically by actuators supported by the bending machine.

* * * * *

UNITED STATES PATENT AND TRADEMARK OFFICE
CERTIFICATE OF CORRECTION

PATENT NO. : 5,329,597
DATED : July 12, 1994
INVENTOR(S) : Hidehiko KOUNO et al.

It is certified that error appears in the above-indentified patent and that said Letters Patent is hereby corrected as shown below:

At column 1, line 12, change "than" to ---that---.
At column 3, line 47, change "has been" to ---has---.
At column 4, line 4, change "inclined" to ---inclined at--

At column 4, line 8, change "andmay" to ---and may---.
At column 7, line 6, change "theimage" to ---the image--

At column 12, line 3, change "pickup" to ---pick up---.
At column 16, line 16 (claim 19, line 9), delete "surfaces on the".

Signed and Sealed this

Twenty-fifth Day of April, 1995

Attest:

BRUCE LEHMAN

*Attesting Officer*  *Commissioner of Patents and Trademarks*